US011833753B2

(12) United States Patent
Sandoval et al.

(10) Patent No.: US 11,833,753 B2
(45) Date of Patent: Dec. 5, 2023

(54) HINGED CLAMP FOR SECURING MEMBRANE ASSEMBLY TO TANK SIDEWALL IN 3D PRINTING SYSTEM

(71) Applicant: Nexa3D Inc., Ventura, CA (US)

(72) Inventors: Miguel Cuevas Sandoval, Camarillo, CA (US); Izhar Medalsy, Ventura, CA (US); Mehdi Mojdeh, Valencia, CA (US); Avi N. Reichental, Carpinteria, CA (US)

(73) Assignee: Nexa3D Inc., Ventura, CA (US)

( * ) Notice: Subject to any disclaimer, the term of this patent is extended or adjusted under 35 U.S.C. 154(b) by 4 days.

(21) Appl. No.: 17/658,983

(22) Filed: Apr. 12, 2022

(65) Prior Publication Data

US 2023/0321909 A1 Oct. 12, 2023

(51) Int. Cl.
*B29C 64/255* (2017.01)
*B33Y 30/00* (2015.01)
*B29C 64/286* (2017.01)

(52) U.S. Cl.
CPC .......... *B29C 64/255* (2017.08); *B29C 64/286* (2017.08); *B33Y 30/00* (2014.12)

(58) Field of Classification Search
CPC ..... B29C 64/255; B29C 64/286; B33Y 30/00; E05D 3/06; E05D 3/12
USPC ..... 16/366, 368, 369, 371, 252, 253; 24/455
See application file for complete search history.

(56) References Cited

U.S. PATENT DOCUMENTS 10,352,354 B1 * 7/2019 Hsu ...................... G06F 1/1641
2011/0089610 A1   4/2011 El-Siblani et al.
2017/0031207 A1 * 2/2017 Li ............................ B33Y 10/00
2019/0152144 A1   5/2019 Munro
2020/0316862 A1 * 10/2020 Medalsy ............... B29C 64/245
2022/0063193 A1   3/2022 Jou et al.

FOREIGN PATENT DOCUMENTS

WO    2018/032531 A1    2/2018
WO    WO-2018032531 A1 * 2/2018

OTHER PUBLICATIONS

"Max User Guide", Asiga (2019), Version 1.07, 68 pgs.
International Search Report and Written Opinion dated Jul. 21, 2023, from the ISA/European Patent Office, for International Patent Application No. PCT/US2023/017059 (filed Mar. 31, 2023), 13 pgs.

* cited by examiner

*Primary Examiner* — Joseph S Del Sole
*Assistant Examiner* — Jamel M Nelson
(74) *Attorney, Agent, or Firm* — ASCENDA LAW GROUP, PC

(57) ABSTRACT

A 3D printing system may include a tank in which a bottom of the tank is formed by a flexible membrane. The flexible membrane may be stretched within a frame, which together with the flexible membrane may form a membrane assembly that is secured to the tank sidewall by one or more hinged clamps. Each of the hinged clamps may comprise an arm and an angled member. The distal end of the arm may comprise a hooked attachment member that is complementary in shape to a lip of the frame of the membrane assembly. The proximal end of the arm may be attached to the angled member by a hinge. The angled member may be attached to the tank sidewall by another hinge. The angled member and the arm may be positioned to clamp the membrane assembly to the tank sidewall, or release the membrane assembly from the tank sidewall.

11 Claims, 21 Drawing Sheets

HINGED CLAMP FOR SECURING MEMBRANE ASSEMBLY TO TANK SIDEWALL IN 3D PRINTING SYSTEM

FIELD OF THE INVENTION

The present invention relates to additive manufacturing systems in which a photo-sensitive resin within a tank is cured through exposure to radiation when fabricating an object, and in particular to a hinged clamp for securing a membrane assembly to the sidewall of the tank.

BACKGROUND

While many advancements have been made in the field of 3D printing, certain challenges have not been sufficiently addressed. These challenges include resin that inadvertently leaks out from the bottom of the tank, as well as the cumbersome nature of installing a liquid crystal display (LCD) mask which typically involves the connection of cables or ribbons. Solutions to such challenges are described herein.

SUMMARY OF THE INVENTION

In accordance with one embodiment of the invention, a 3D printing system may include a tank in which a bottom of the tank is formed by a radiation-transparent flexible membrane. The membrane may be stretched by a frame, which together with the membrane may form part of a membrane assembly that is secured to the tank sidewall by one or more hinged clamps. Each of the hinged clamps may comprise an arm and an angled member. The distal end of the arm may comprise a hooked attachment member that is complementary in shape to a lip of the frame of the membrane assembly, while the proximal end of the arm may be attached to the angled member by a hinge. The angled member in turn may be attached to the outer surface of the tank sidewall by another hinge. The angled member and arm may be positioned to clamp the membrane assembly to the tank sidewall, or may be positioned to release (or unclamp) the membrane assembly from the tank sidewall.

In accordance with another embodiment of the invention, a 3D printing system may include a tank in which a bottom of the tank is formed by a radiation-transparent flexible membrane, a spill tray with an outer wall configured to contain photo-curable liquid resin that leaks out from the bottom of the tank, and a light source configured to project radiation towards the bottom of the tank. The spill tray may contain an inner opening that allows the radiation from the light source to pass through the spill tray to the tank. An elevation of a bottom surface of the spill tray may be lower than an elevation of the radiation-transparent flexible membrane so that resin that leaks from the tank flows downwards into the spill tray.

In accordance with another embodiment of the invention, a 3D printing system may include a tank in which a bottom of the tank is formed by a radiation-transparent flexible membrane, a light source configured to project radiation towards the bottom of the tank, a mask assembly (disposed between the tank and the light source) that comprises a mask with pixels configurable to be individually transparent or opaque to portions of the radiation projected from the light source, and a mask assembly receiving member configured to receive the mask assembly. The mask assembly may also include a rigid guide portion that is insertable into a slot of the mask assembly receiving member. An end of the rigid guide portion may comprise an electrical connector with a male coupling that is paired with an electrical connector (mounted on a housing of the light source) with a female coupling. Conveniently, the mating of the male and female couplings of the electrical connectors may be performed simultaneously with the insertion of the rigid guide portion of the mask assembly into the slot of the mask assembly receiving member without the need to manually manipulate cables and/or ribbons.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1:
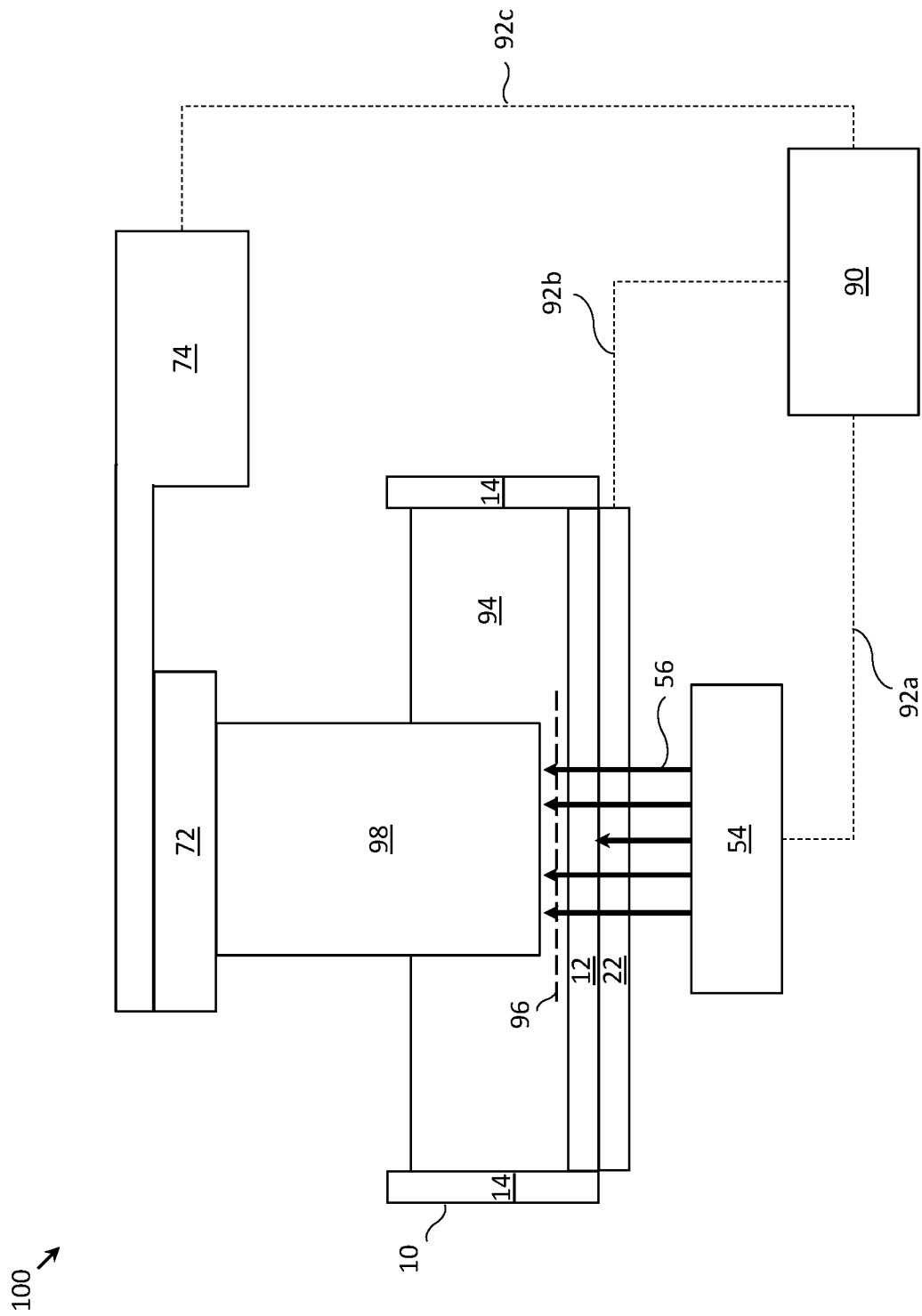
FIG. 1 depicts a schematic cross-section of a 3D printing system in which an object undergoes fabrication in a tank containing a photo-curable liquid resin, in accordance with one embodiment of the invention.

FIG. 1 depicts a cross-section of a three-dimensional (3D) printing system 100 (also called a vat polymerization printer), in which electromagnetic radiation 56 (e.g., ultraviolet light) is used to cure photo-curable liquid resin 94 in order to fabricate an object 98 (e.g., a 3D object). The object 98 may be fabricated layer by layer; that is, a new layer of the object 98 may be formed by photo-curing a layer 96 of liquid resin 94 adjacent to the bottom surface of the object 98 (also called the build area), the object 98 may be raised by an extractor plate 72, allowing a new layer of liquid resin 96 to be drawn under the newly formed layer; and the process repeated to form additional layers.

The 3D printing system 100 includes a tank 10 for containing the liquid resin 94. The sides of the tank 10 may be formed by tank sidewalls 14, and the bottom of the tank 10 may be formed by a radiation-transparent flexible membrane 12 that allows radiation 56 from a light source 54 to enter into the tank 10. The light source 54 may comprise a light emitting diode (LED) array or another light source such as a digital light processor (DLP) light projector. A mask 22 may be disposed between the bottom of the tank 10 and the light source 54 to spatially filter the radiation 56 that is incident on layer 96, so that specific regions of the liquid resin 94, that correspond to the cross section of the object 98 being printed, are cured. Mask 22 may be a transmissive spatial light modulator, such as a liquid crystal display (LCD) with a two-dimensional array of addressable pixels. More specifically, the LCD may be a high resolution 4$k$ monochrome 9.3 inch LCD with a pixel size of 53 microns. Certain ones of the pixels may be controlled to be transparent, while others may be controlled to be opaque. Transparent pixels allow radiation 56 to pass through the mask 22 at certain spatial locations of the mask 22 and into the tank 10, consequently curing portions of the liquid resin 94, while opaque pixels prevent radiation 56 from passing through certain spatial locations of mask 22. In addition to an LCD, mask 22 may include other optical elements, such as optical diffusers, collimation films, polarizers, etc. In an embodiment where the light source 54 is a DLP light projector, mask 22 is optional (since the image may be formed by the DLP light projector instead of the LCD), in which case, mask 22 may be replaced by a plane of glass (not depicted).

One challenge faced by 3D printing systems of the present kind is that in addition to adhering to the object 98, newly formed layers tend to adhere to the bottom of the tank 10. Consequently, when the extraction plate 72 to which the object 98 is attached is raised by the height adjustor 74, the newly formed layer could tear and/or become dissociated from the object 98. To address this issue, a flexible membrane 12 may be used to form the bottom of the tank 10. Flexible membrane 12 may be formed of silicone or another material, and optionally, coated with a non-stick material such as polytetrafluoroethylene (PTFE) to reduce the likelihood for the newly formed layer to adhere to the bottom of tank 10. The flexible membrane 14 is transparent (or nearly so) to the wavelength of radiation emitted by the light source 54 so as to allow the radiation 56 to enter into the tank 10 and cure the liquid resin 94.

The printing operations may be automated by a controller 90, which may be communicatively coupled to the light source 54, the mask 22, and the height adjustor 74 via control signal paths 92$a$, 92$b$ and 92$c$, respectively (e.g., electrical signal paths). The controller 90 may control the addressable pixels of the mask 22 such that the transparent pixels of the mask 22 correspond to a cross section of an object to be printed. The controller 90 may control the light source 54 to turn on only when the resin 94 needs to be cured so as to minimize the heating of the mask 22 (which in turn minimizes the heating of the resin 94). Further, the controller 50 may control the height adjustor 74 to control the vertical position of the height extractor 72, and consequently of the object (or partially formed object) 98 that is affixed to the height extractor 72. Using the height extractor 74, the position of the object 98 may be translated in a direction perpendicular to an extent of the flexible membrane 12.

Figure 2:
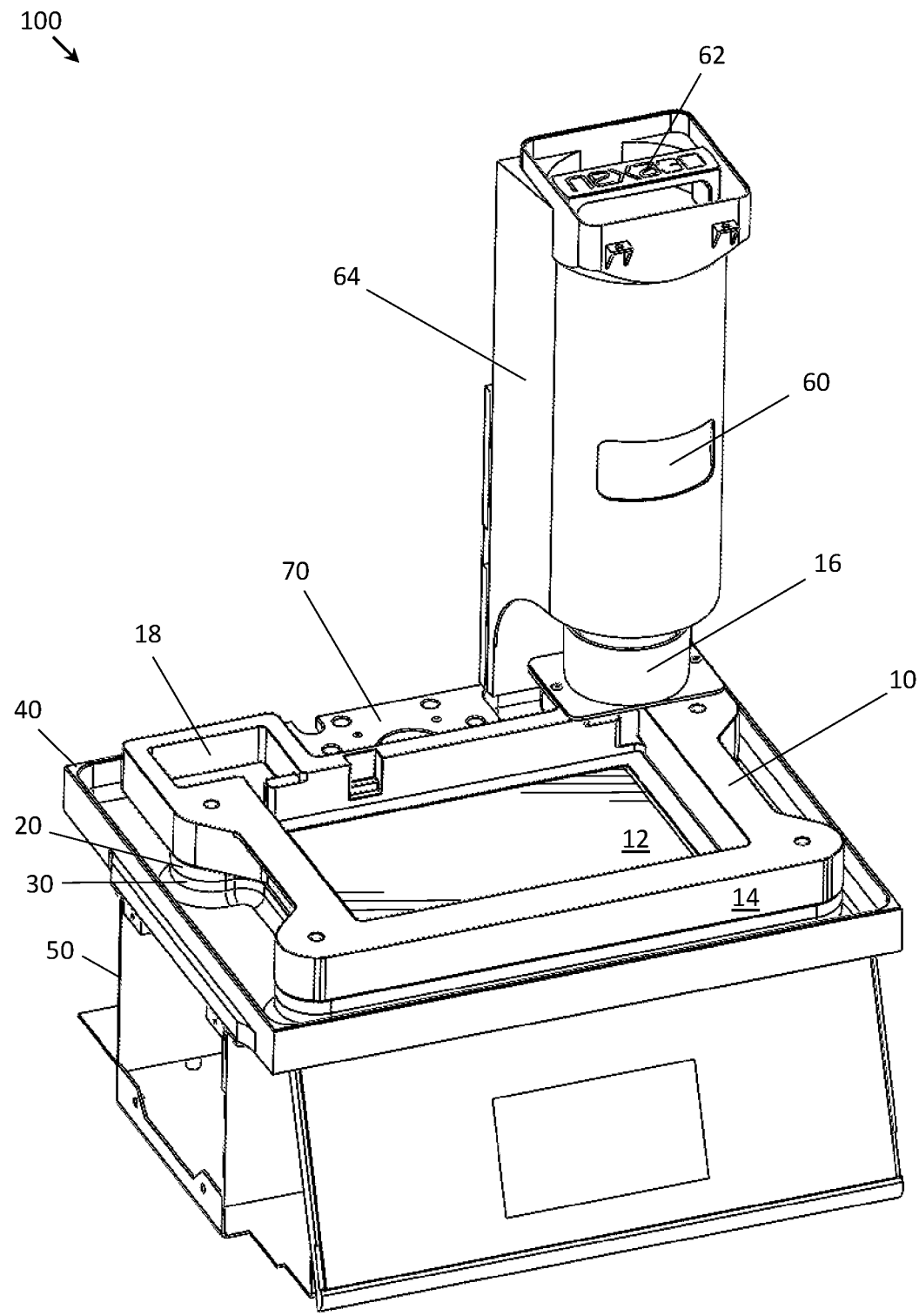
FIG. 2 depicts a perspective view of certain components of the 3D printing system including a tank for containing resin, a spill tray surrounding the tank, the housing of a light source and a gravity-assisted resin dispenser, in accordance with one embodiment of the invention.

FIG. 2 depicts a perspective view of certain components of the 3D printing system 100 including the tank 10 for containing resin (the resin not depicted in FIG. 2 for clarity), a spill tray 40 surrounding the tank 10 for containing any resin that leaks out from the bottom of the tank 10, the housing 50 of the light source (the light source not visible in FIG. 2) and a gravity-assisted resin dispenser for replenishing the resin in the tank 10 and maintaining a constant level of the resin. The gravity-assisted resin dispenser may include a resin cartridge 60 for supplying resin to the tank 10, and a cartridge holder 64 that positions an opening of the resin cartridge 60 within a resin receptacle 16. The resin receptacle 16 receives resin that is dispensed from the resin cartridge 60 and transfers that resin into the tank 10. In principle, the gravity-assisted resin dispenser operates similarly to a pet water dispenser. Resin that is dispensed from the resin cartridge 60 fills the tank 10, and keeps filling the tank 10 until the resin in the tank 10 reaches a certain predetermined fill level. At that fill level, the vacuum that has built up inside of the resin cartridge 60 is sufficient to prevent any additional resin from being released from the resin cartridge 60. When the resin in the tank 10 is depleted below this fill level (i.e., as a result of printing operations), air flows into the resin cartridge 60 through an air conduit 17

Figure 8:
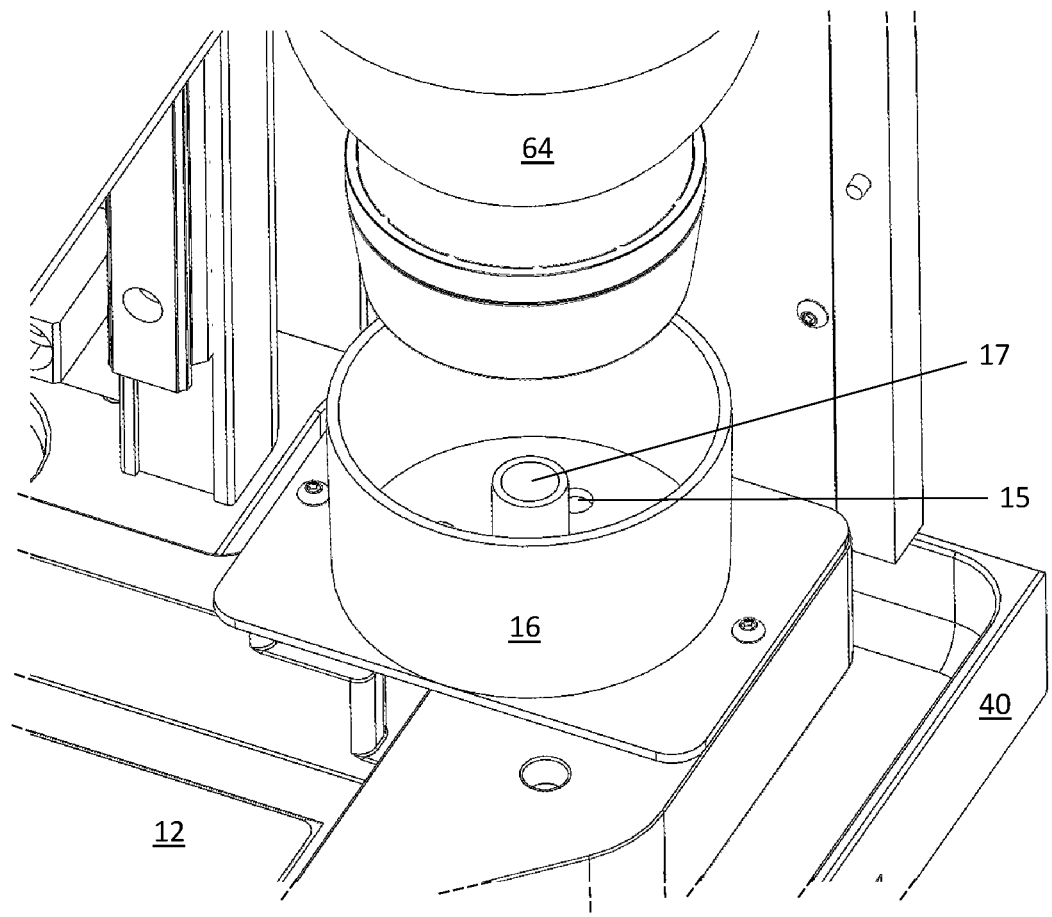
FIG. 8 depicts an enlarged perspective view of the resin receptacle that is mounted on the tank, in accordance with one embodiment of the invention.

(depicted in FIG. 8). Such air reduces the vacuum inside of the resin cartridge 60, allowing an additional volume of resin to be dispensed from the resin cartridge 60 until the resin in the tank 10 again reaches the predetermined fill level. As shown in FIG. 2, the resin cartridge 60 may include a handle 62 for a human operator to easily grasp the top of the resin cartridge 60 (e.g., to carry the resin cartridge 60, pull the resin cartridge 60 out of the cartridge holder 64, etc.).

One problem occasionally encountered in 3D printing systems is resin leaking out from the bottom of the tank 10. For example, a tear or perforation in radiation-transparent flexible membrane 12 may cause resin to leak out from the bottom of the tank 10. In prior system, such leak may occur during a time the 3D printing system is in use and not being monitored by a human operator (e.g., middle of the night), resulting in a messy cleanup situation for the operator. In one embodiment of the present invention, a spill tray 40 is provided to contain any resin that leaks out from the bottom of the tank 10. In a preferred embodiment, the volume of the spill tray 40 may be equal or greater than the volume of the resin cartridge 60 such that in the worst case that the resin from a full resin cartridge 60 leaks out from the bottom of the tank 10, all of the leaked resin would be safely contained within the spill tray 40. While cleanup of the leaked resin in the spill tray 40 would still be necessary (e.g., using a suction apparatus), at least the leaked resin is contained in an easily accessible and easy to clean location, rather than being leaked into other areas of the printer (e.g., light source, floor of printer housing) that could result in damage to the printer or outside of the printer (e.g., onto the floor, carpet, etc.). As shown, the spill tray 40 may be disposed on top of a housing 50 that encloses the light source (the light source not visible in FIG. 2). It is also possible for the spill tray 40 to be removable, so that the spilled resin can be cleaned up by removing the spill tray 40 from the 3D printing system 100 and pouring the spilled resin from the spill tray 40 into a container. Additional features of the spill tray 40 will be described in connection with the subsequent figures.

Figure 6A:
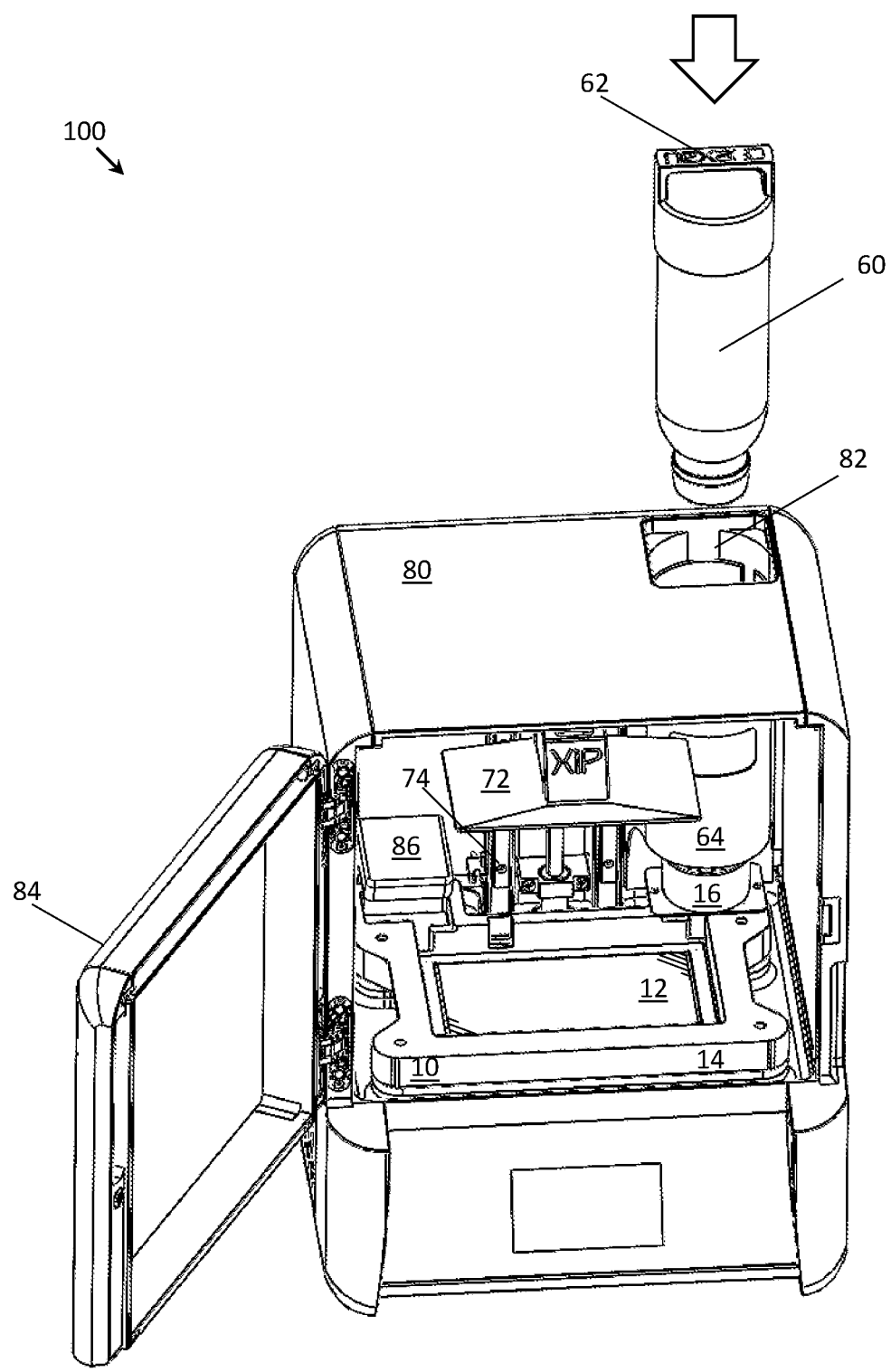
FIGS. 6A-6B depict perspective views showing the insertion of a resin cartridge into the gravity-assisted resin dispenser through an opening in the housing of the 3D printing system, in accordance with one embodiment of the invention.
Figure 6B:
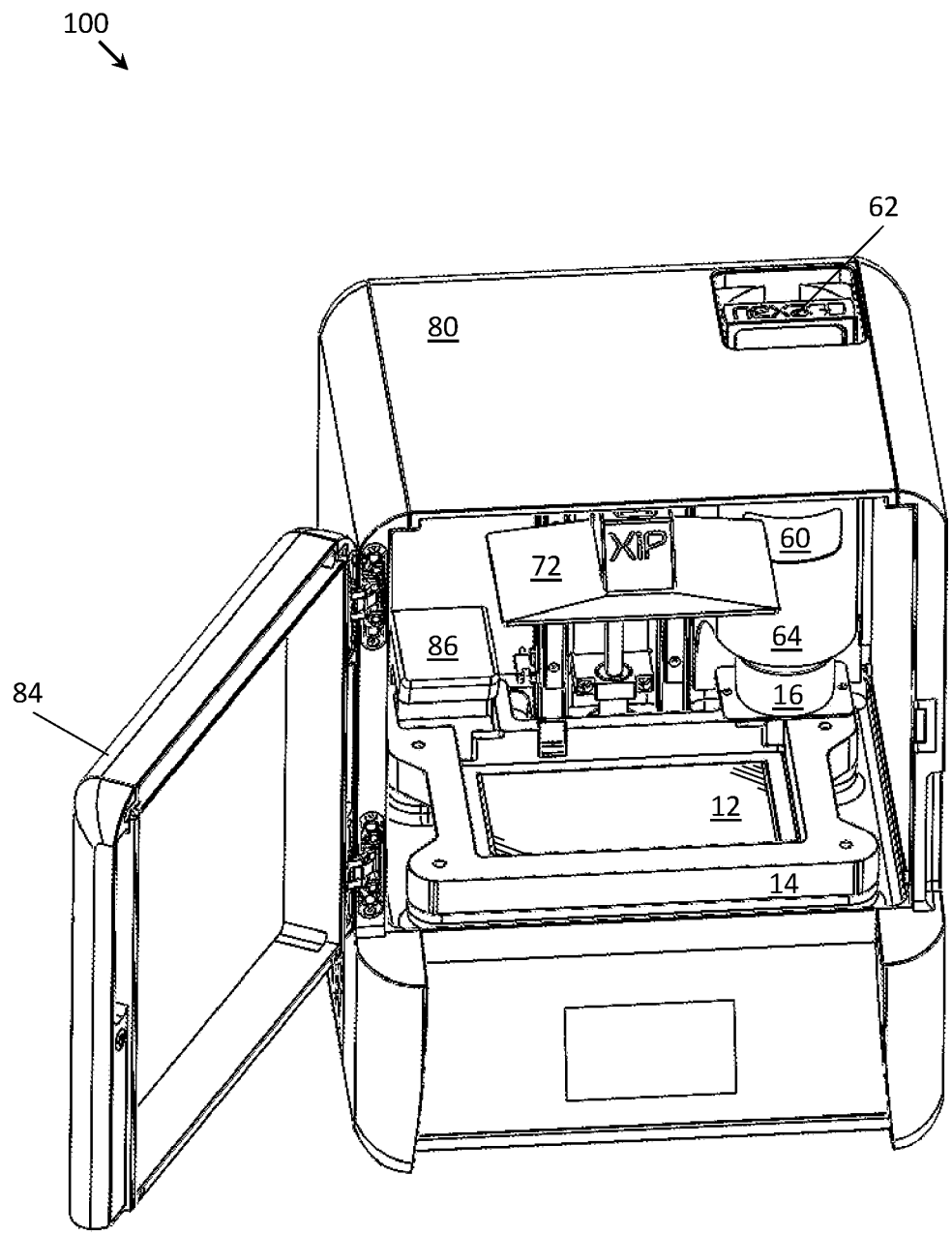
Figure 7:
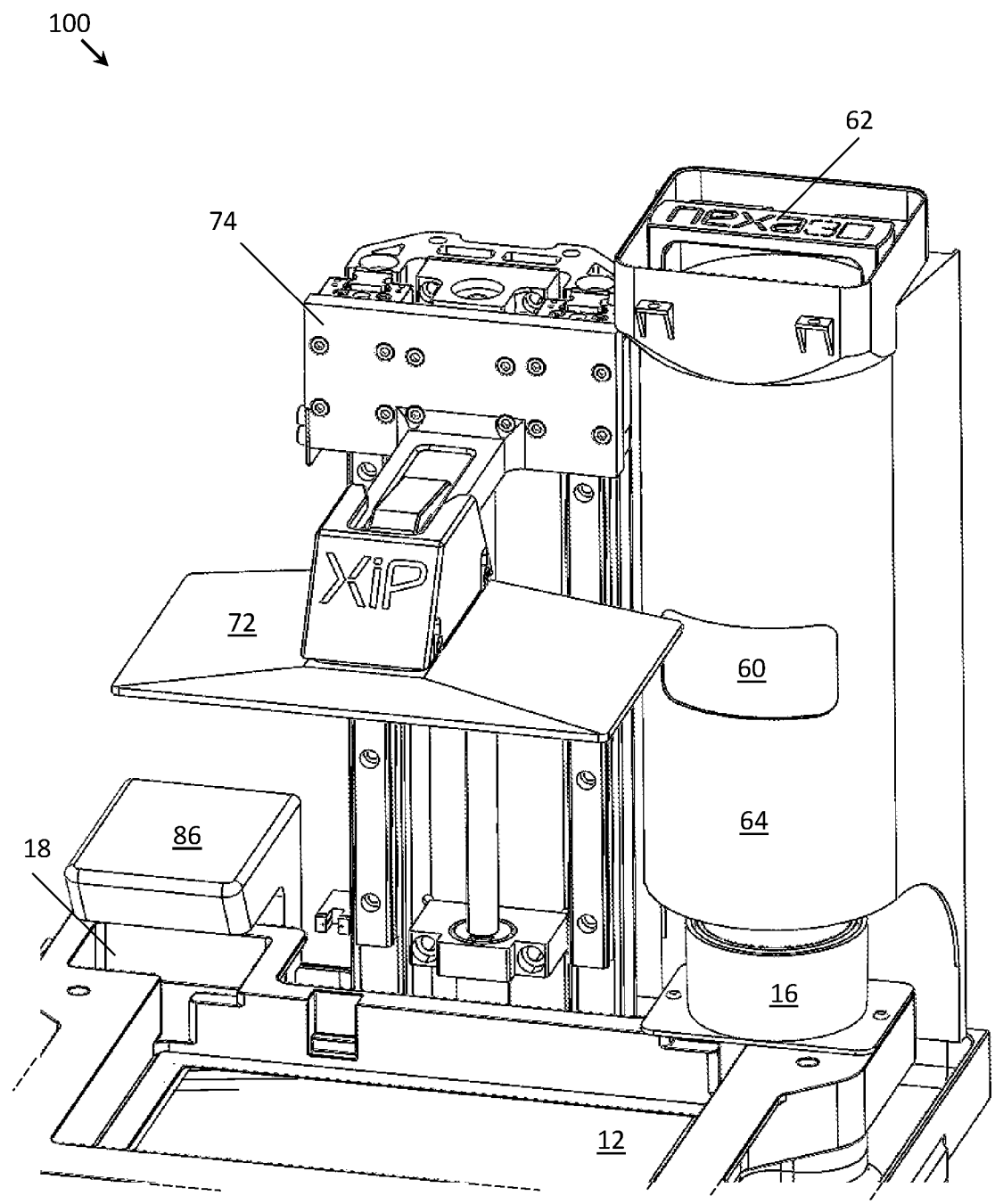
FIG. 7 depicts an enlarged perspective view of certain components of the 3D printing system, including the extraction plate, height adjustment mechanism, gravity-assisted resin dispenser, and level detector, in accordance with one embodiment of the invention.

The tank 10 may include four (rigid) sidewalls 14 that surround the inner cavity of the tank 10, and a radiation-transparent flexible membrane 12 that forms the bottom of the tank 10. The sidewalls 14 of the tank may form a rectangular frame that stretches the radiation-transparent flexible membrane 12 in a direction perpendicular to an extent of the radiation-transparent flexible membrane 12 so as to create tension in the transparent flexible membrane 12. The tank 10 may include a cove 18 that is fluidly connected to the inner cavity of the tank 10. As will be further described in connection with FIG. 6A, the level of resin in cove 18 may be monitored by a level detector 86 so as to monitor the level of resin within the tank 10. As will also be more clearly depicted in the figures to follow, the tank 10 may rest on a mask assembly 20, which in turn may be secured to a mask assembly receiving member 30. A mount 70 is used to secure a height adjustment mechanism (not depicted in FIG. 2, but is depicted in FIGS. 6A-B and 7).

Figure 3:
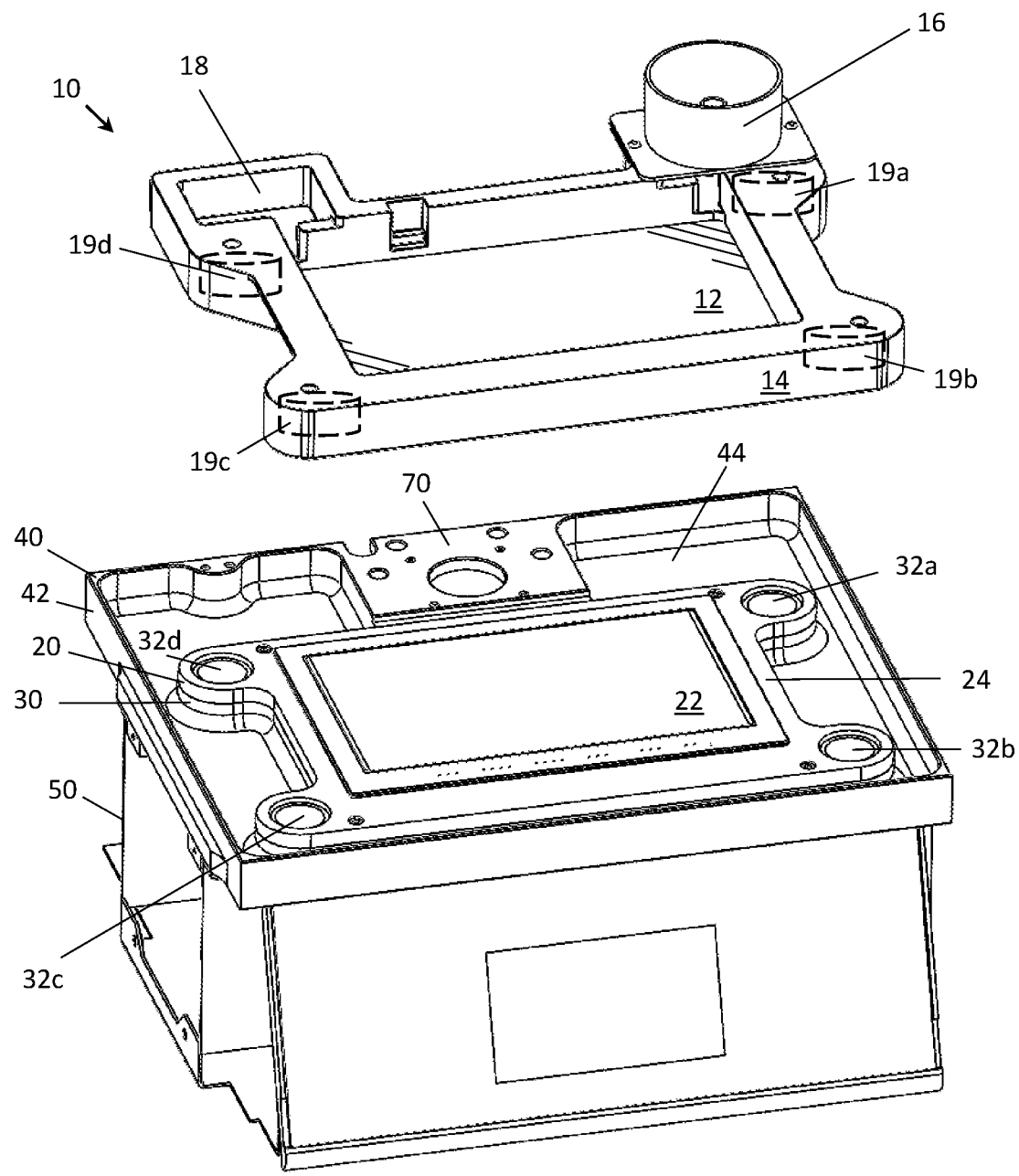
FIG. 3 depicts a perspective view of certain components of the 3D printing system, in which the tank is shown spaced apart from the 3D printing system so as to show the mask assembly disposed underneath the tank, in accordance with one embodiment of the invention.

FIG. 3 shows how the tank 10 can be conveniently removed and attached to the 3D printing system using a magnetic attachment mechanism. Four magnets (19a, 19b, 19c, 19d) disposed on a bottom surface of the tank 10 may be attracted to four magnetic posts (32a, 32b, 32c, 32d) disposed on the surface of the spill tray 40, allowing the tank 10 to be clamped to the 3D printing system (during the installation of the tank), and subsequently removed from the 3D printing system. Further, due to the automatic alignment of the four magnets (19a, 19b, 19c, 19d) to the four magnetic posts (32a, 32b, 32c, 32d), the tank 10 and the mask 22 (e.g., LCD) of the mask assembly 20 are automatically aligned with respect to one another. It is understood that in other embodiments (not depicted), a different number of magnets may be employed. Further, it is understood that some of the elements referred to herein as "magnets" may instead be composed of ferromagnetic materials such as iron, nickel and cobalt.

As is more clearly visible in FIG. 3, the spill tray 40 may comprise an outer wall 42 and an inner wall that is formed by a stacked arrangement of the mask assembly 20 and the mask assembly receiving member 30. The outer wall 42 and the inner wall may be oriented in a direction that is substantially perpendicular to the bottom surface 44 of the spill tray 40. Further, the elevation of the bottom surface 44 of the spill tray 40 may be lower than the elevation of the bottom of the tank 10 (i.e., the flexible membrane 12), allowing any resin that leaks out from the tank 10 to flow downwards into the spill tray 40. In another embodiment (not depicted), the bottom surface 44 of the spill tray 40 may be a non-planar (e.g., curved) surface, causing the spilled resin (at least initially) to flow towards one or more depressions disposed on the bottom of the spill tray 40. In another embodiment (not depicted), the bottom surface of the spill tray 40 may include a drain that is fluidly connected to a container (i.e., that is distinct from the resin cartridge 60), such that the spilled resin flows out of the spill tray 40 into the container. In such an embodiment, the spill tray 40 may be more appropriately called a funnel, as the function of the spill tray 40 would be to funnel the spilled resin into the container that is connected to the drain of the spill tray 40. The mask assembly 20 is also more clearly visible in FIG. 3, and includes a mask 22 that is secured within a frame 24.

Figure 4A:
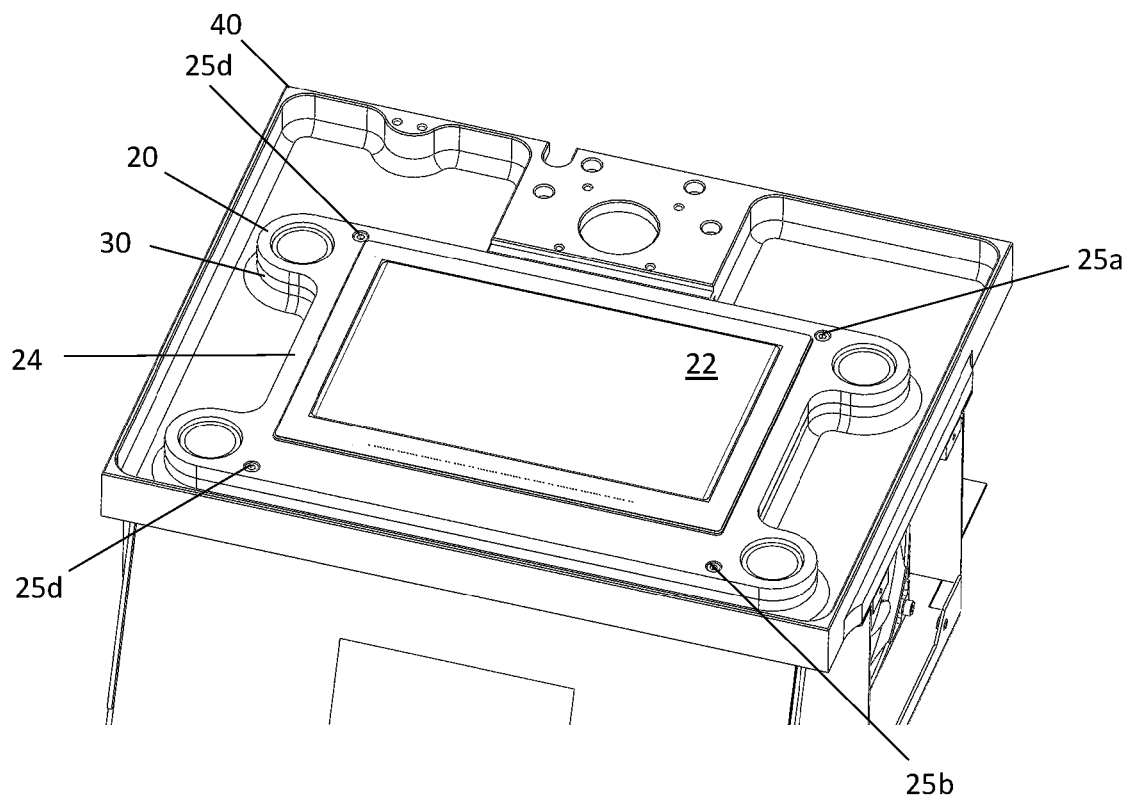
FIGS. 4A-4C depict a series of perspective views in which the mask assembly is progressively separated from the 3D printing system so as to show the mask assembly receiving member, central opening of the spill tray, and light source disposed underneath the mask assembly, in accordance with one embodiment of the invention.
Figure 4B:
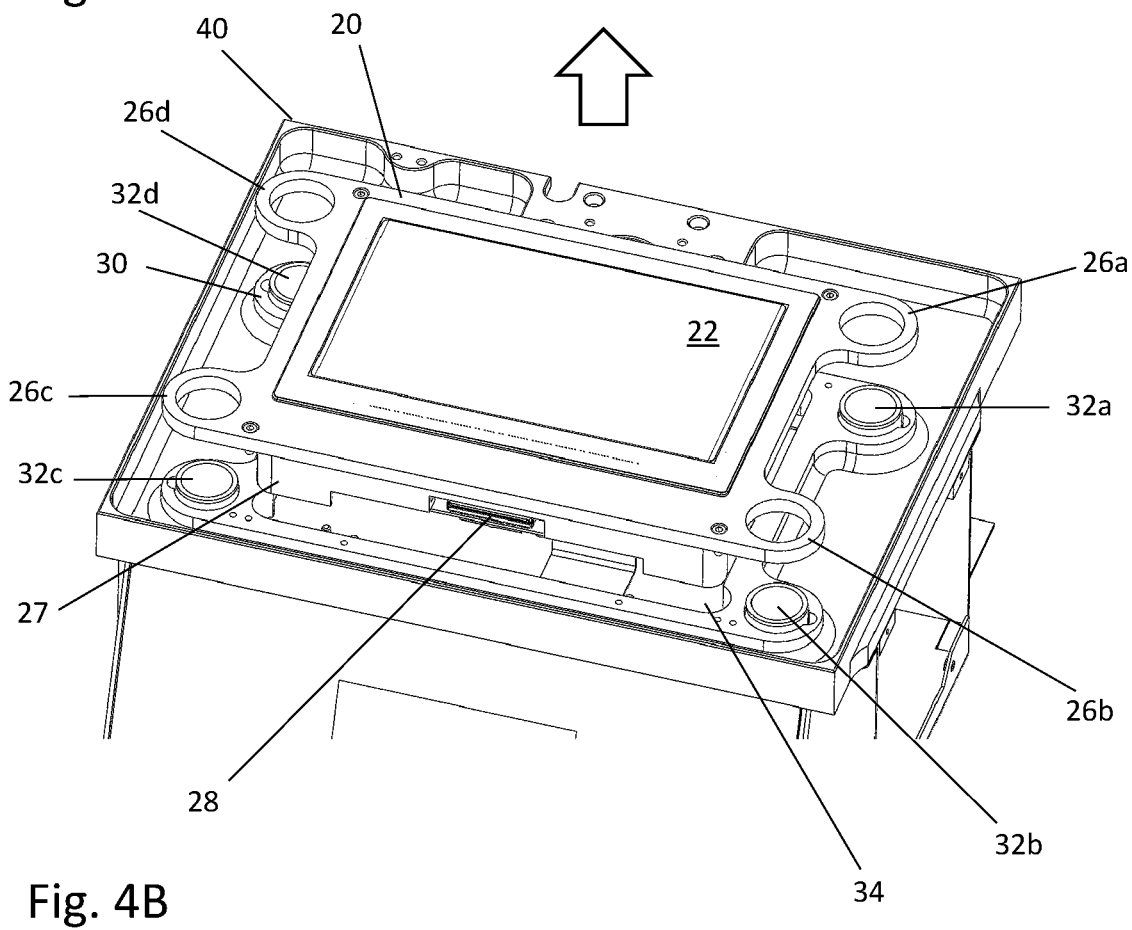
Figure 4C:
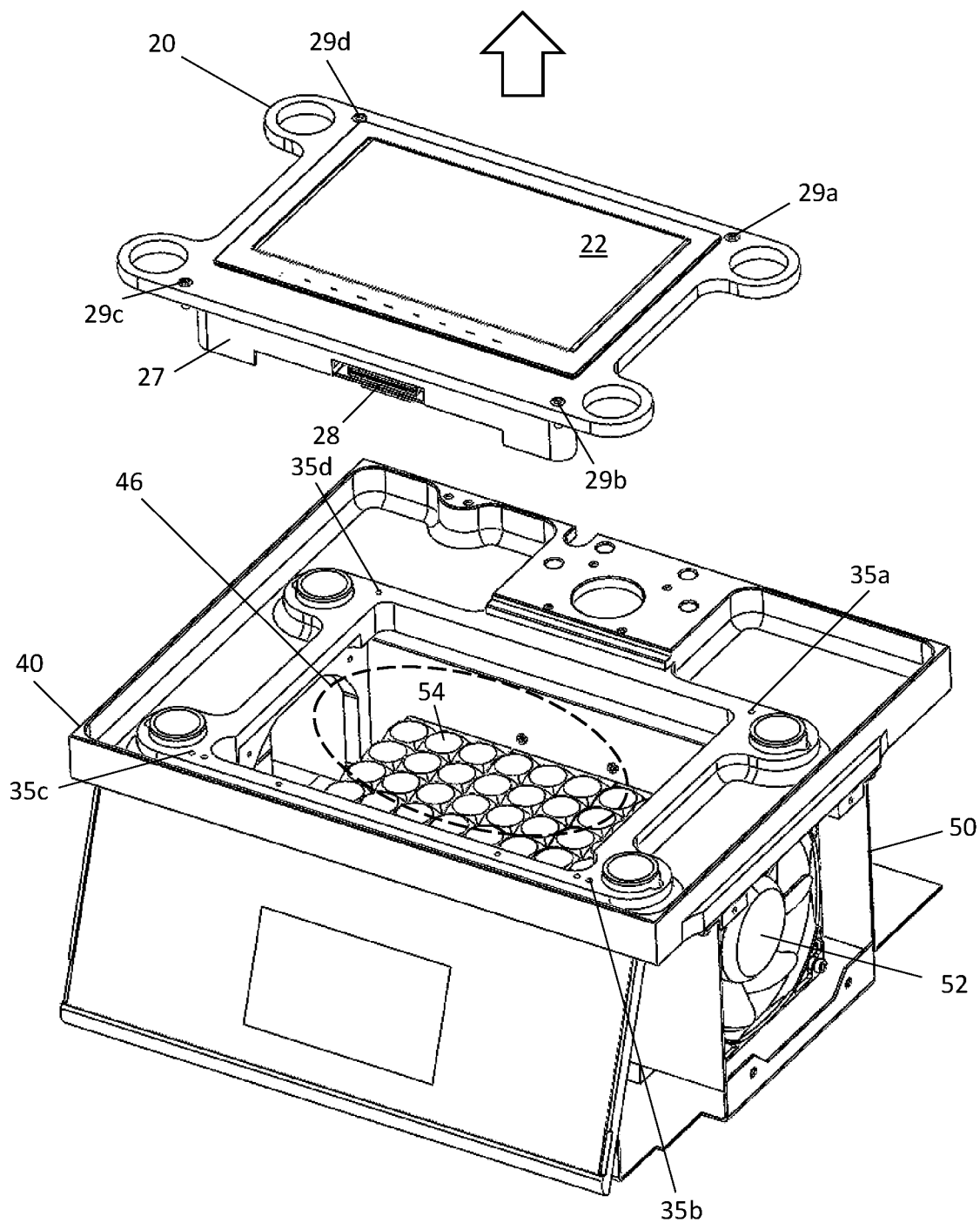

FIGS. 4A-4C show how the mask assembly 20 can be conveniently removed from the mask assembly receiving member 30 of the 3D printing system. First, four screws (25a, 25b, 25c, 25d) may be unscrewed from the surface of the mask assembly 20. Then, the mask assembly 20 may be pulled apart from the mask assembly receiving member 30 by separating the four ring members (26a, 26b, 26c and 26d) from the four magnetic posts (32a, 32b, 32c, 32d) of the mask assembly receiving member 30. For clarity, it is noted that the four ring members (26a, 26b, 26c and 26d) and frame 24 of the mask assembly 20 may be made from a material that is neither attracted to nor repelled by the four magnetic posts (32a, 32b, 32c, 32d), such as plastic or fiber glass.

The reverse process may be performed to install the mask assembly 20. First, the four ring members (26a, 26b, 26c and 26d) of the mask assembly 20 may be inserted over the four magnetic posts (32a, 32b, 32c, 32d) of the mask assembly receiving member 30. At the same time, a rigid guide member 27 of the mask assembly 20 may be inserted into a slot 34 of the mask assembly receiving member 30. The alignment of the rigid guide member 27 with respect to the slot 34 and the alignment of the four ring members (26a, 26b, 26c and 26d) with respect to the four magnetic posts (32a, 32b, 32c, 32d) may automatically align four screw holes (29a, 29b, 29c, 29d) of the mask assembly 20 with four screw holes (35a, 35b, 35c, 35d) of the mask assembly receiving member 30. Finally, four screws (25a, 25b, 25c, 25d) may be used to secure the mask assembly 20 to the mask assembly receiving member 30. While four screws have been described, it is understood that other embodiment may utilize a greater or fewer number of screws, or no screws at all. For example, the screws could be replaced with pegs and/or the mask assembly 20 could have a tongue on its bottom surface that fits into a groove on the top surface of the mask assembly receiving member 30. The cable-(ribbon-) free electrical connection between the mask assembly 20 and the mask assembly receiving member 30 will be explained below in connection with FIGS. 5A-5C.

In one embodiment, the mask assembly 20 may be regarded as a "replaceable modular LCD." That is, when the mask assembly 20 reaches the end of its lifetime or fails for some reason, a new mask assembly 20 may be ordered, the old mask assembly 20 may be removed and the new mask assembly 20 may be installed, in accordance with the above description. In another embodiment, the frame 24 of the mask assembly 20 may be reused and only the mask 22 may be replaced.

As shown in FIG. 4C, removal of the mask assembly 20 exposes the light source 54 that is located within the light source housing 50. More specifically, what is visible in FIG. 4C is an array of lenses of a light emitting diode (LED) array. In other embodiments, the light source 54 may instead be a digital light projector (DLP) light source or other light source. A fan 52 secured to the housing 50 may be used cool the light source 54 (as needed). Also visible in FIG. 4C is the central opening 46 of the spill tray 40 through which radiation from the light source 54 passes through to reach the tank 10. It is noted that the seal between the mask assembly receiving member 30 and the spill tray 40 is fluid tight so as to prevent any of the spilled resin from leaking into the light housing 50 through the central opening 46 of the spill tray 40. It is further noted that the light source 54 may be serviced and maintained through the central opening 46 of the spill tray 40.

Figure 5A:
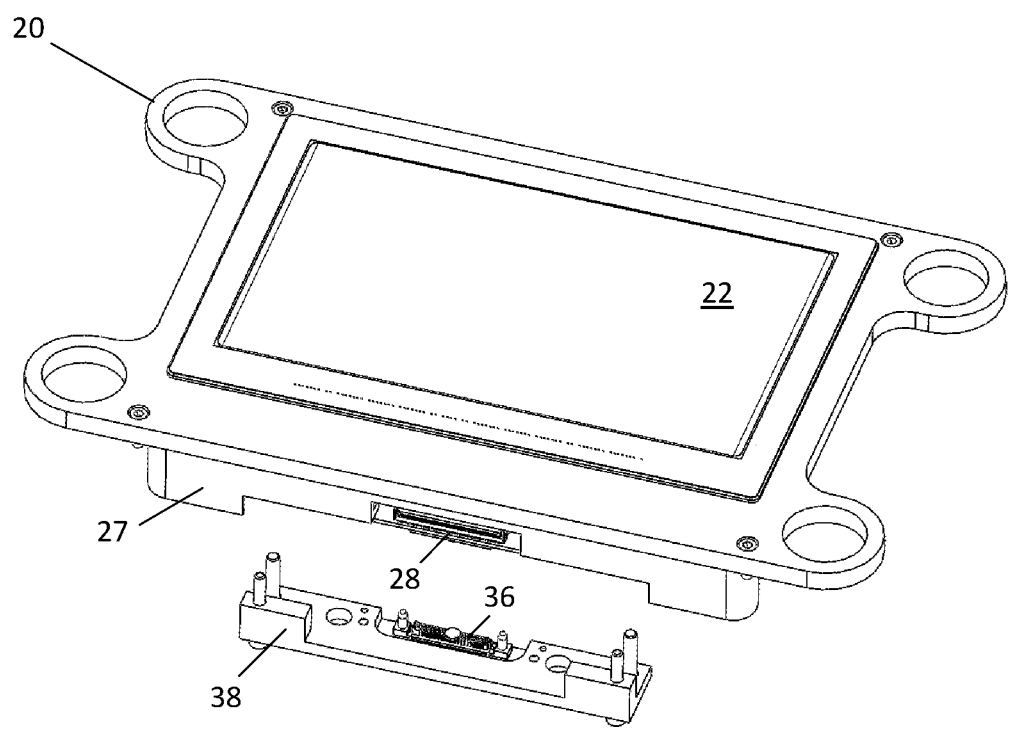
FIGS. 5A-5C depict perspective views showing the alignment and mating of two electrical connectors, in accordance with one embodiment of the invention.
Figure 5B:
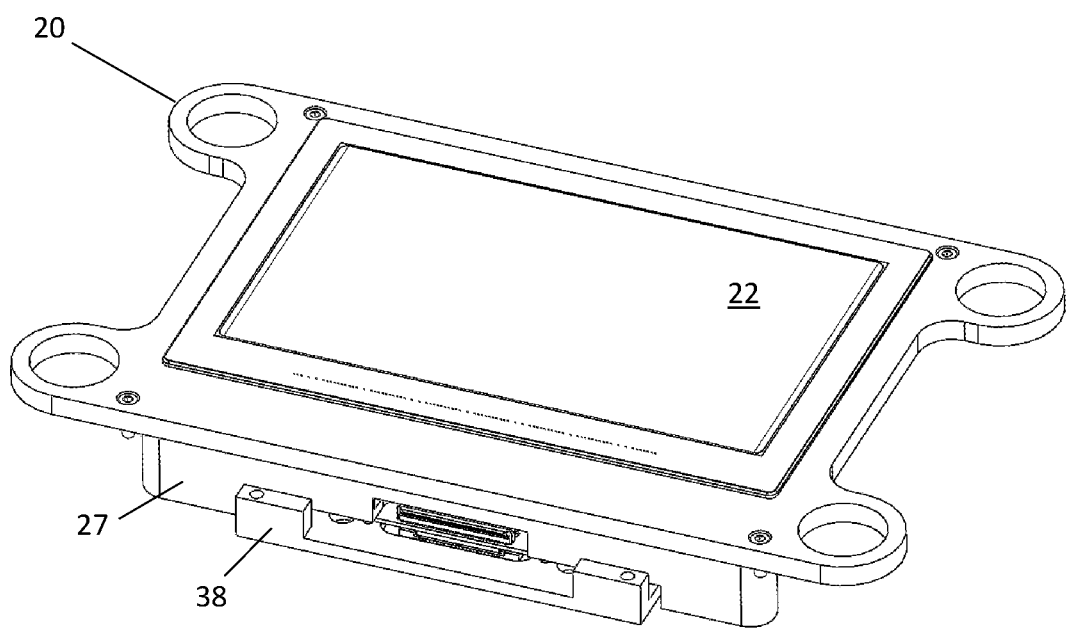
Figure 5C:
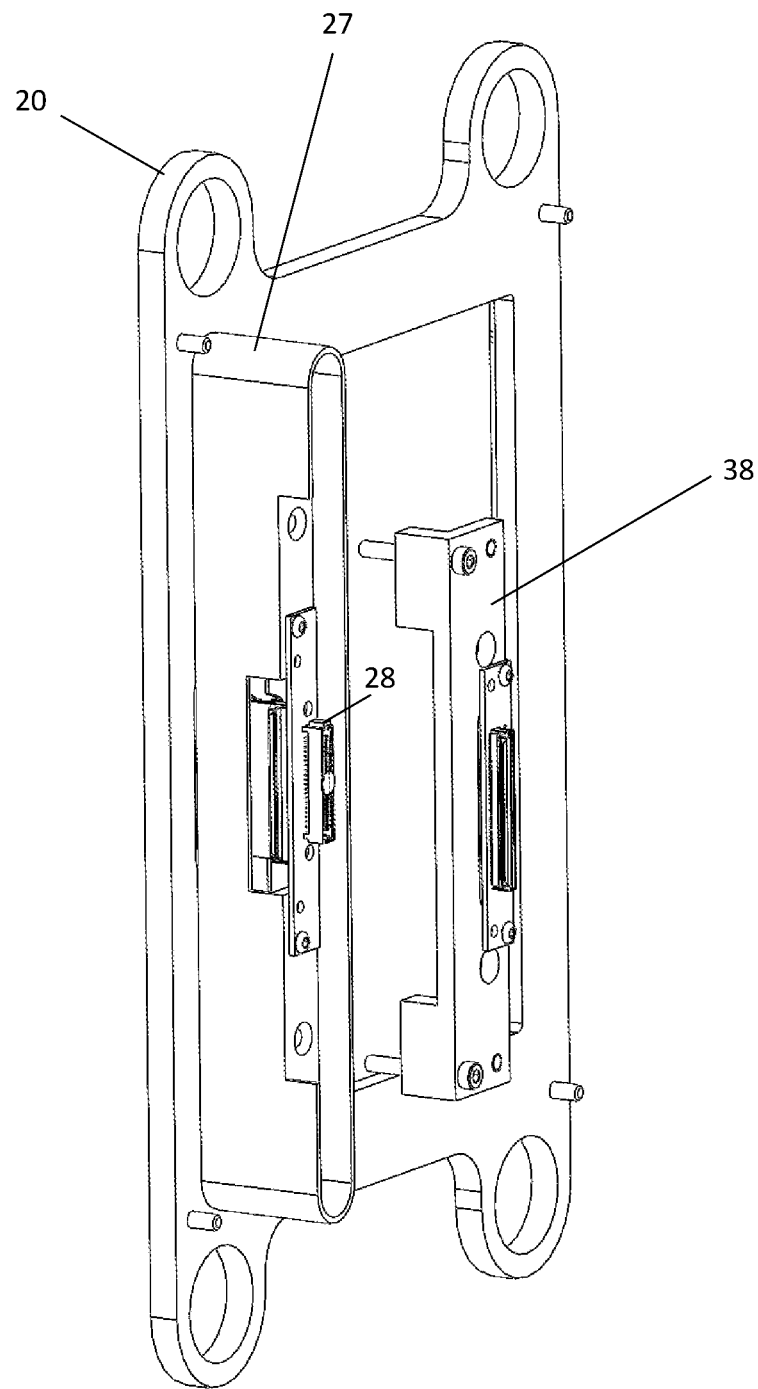

FIGS. 5A-5C depict the cable- (ribbon-) free electrical connection mechanism between the mask assembly 20 and the mask assembly receiving member 30 in greater detail. An electrical connector 28 (e.g., a high-definition multimedia interface (HDMI) connector, a mobile industry processor interface (MIPI) connector, a digital visual interface (DVI) connector, a DisplayPort (DP) connector, a low-voltage differential signalling (LVDS) connector, etc.) of the mask assembly 20 may be disposed on an end of the rigid guide member 27 of the mask assembly 20, and be paired with a matching electrical connector 36 that is mounted on a support bracket 38. For clarity, the support bracket 38 is depicted in a standalone form, but it is understood that such support bracket 38 is fixedly mounted within (or partially within) the light source housing 50. Importantly, installing the mask assembly 20 on the mask assembly receiving member 30 (in accordance with the above-described process) automatically causes the electrical connector 28 to be mated with the electrical connector 36 without the need to manually manipulate electrical cables or ribbons (as commonly takes place in prior solutions). Likewise, the removal of the mask assembly 20 from the mask assembly receiving member 30 (in accordance with the above-described process) automatically causes the electrical connector 28 to be disconnected from the electrical connector 36 without the need to manually manipulate electrical cables or ribbons (as commonly takes place in prior solutions). In the particular embodiment depicted in FIGS. 5A-5C, electrical connector 28 is a male coupling and electrical connector 36 is a female coupling, but it is understood that the reverse may be true in other embodiments (i.e., electrical connector 28 may be a female coupling and electrical connector 36 may be a male coupling).

FIGS. 6A-6B depict the above-described printer components and other components being disposed within a printer housing 80. Such components are depicted in an enlarged view in FIG. 7 (without the printer housing 80) for clarity.

The inside of the printer housing 80 may be accessible through a door 84 that is mounted on a side panel of the printer housing 80 by way of a pair of hinges. While the tank 10, mask assembly 20 (not clearly visible in FIG. 6A) and the final printed object (not depicted in FIG. 6A) may be accessed through the door opening, a separate opening 82 may be used to insert (and remove) of the resin cartridge 60 into (from) the cartridge holder 64. Also visible in FIG. 6A is the above-described extractor plate 72 and the height adjustment mechanism 74.

Figure 9:
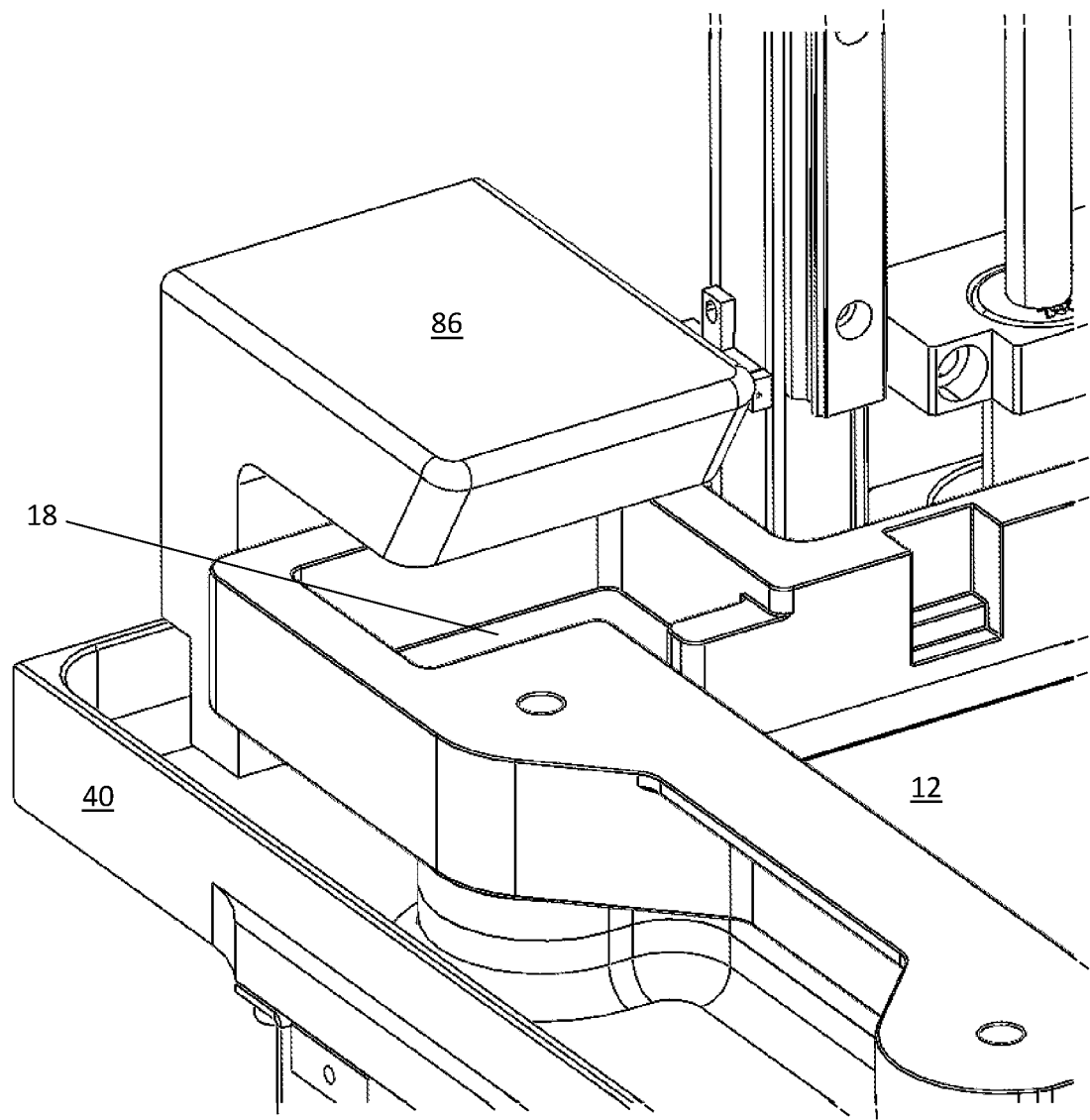
FIG. 9 depicts an enlarged perspective view of the level detector of the tank, in accordance with one embodiment of the invention.

A resin level detector 86 may be disposed above cove 18 to monitor the level of resin in the tank 10. In one embodiment, the resin level detector 86 may transmit a pulse of energy (e.g., laser pulse, ultrasonic pulse) that is reflected off of the surface of the resin in cove 18, and such reflected pulse of energy is then detected by resin level detector 86. The round trip time of the energy pulse may be measured and converted into a distance using the speed at which the energy pulse travels. Finally, such distance may be used to estimate the level of the resin in the cove 18, and accordingly the level of resin in the tank 10. For increased clarity, the level detector 86 and cove 18 are depicted in a magnified view in FIG. 9 below. Using the level detector 86, the 3D printer system 100 may track the resin level in the tank 10 and start a printing job automatically once the resin level reaches a predetermined level. Accordingly, the user can start his/her print job and walk away knowing that the printing job is being monitored.

FIG. 8 depicts an enlarged view of the resin receptacle 16 that is mounted on a side of the tank 10. The resin receptacle 16 may contain an air conduit 17 that is inserted into the (bottom) opening of the resin cartridge 60 (shown decoupled from the resin receptacle 16 in FIG. 8). As described above, the buildup of vacuum within the resin cartridge 60 may cause air to flow into the resin cartridge 60 through air conduit 17. Resin that flows out of the resin cartridge 60 may flow into the cavity of tank 10 through one or more holes 15 disposed on a bottom surface of the resin receptacle 16.

Figure 10A:
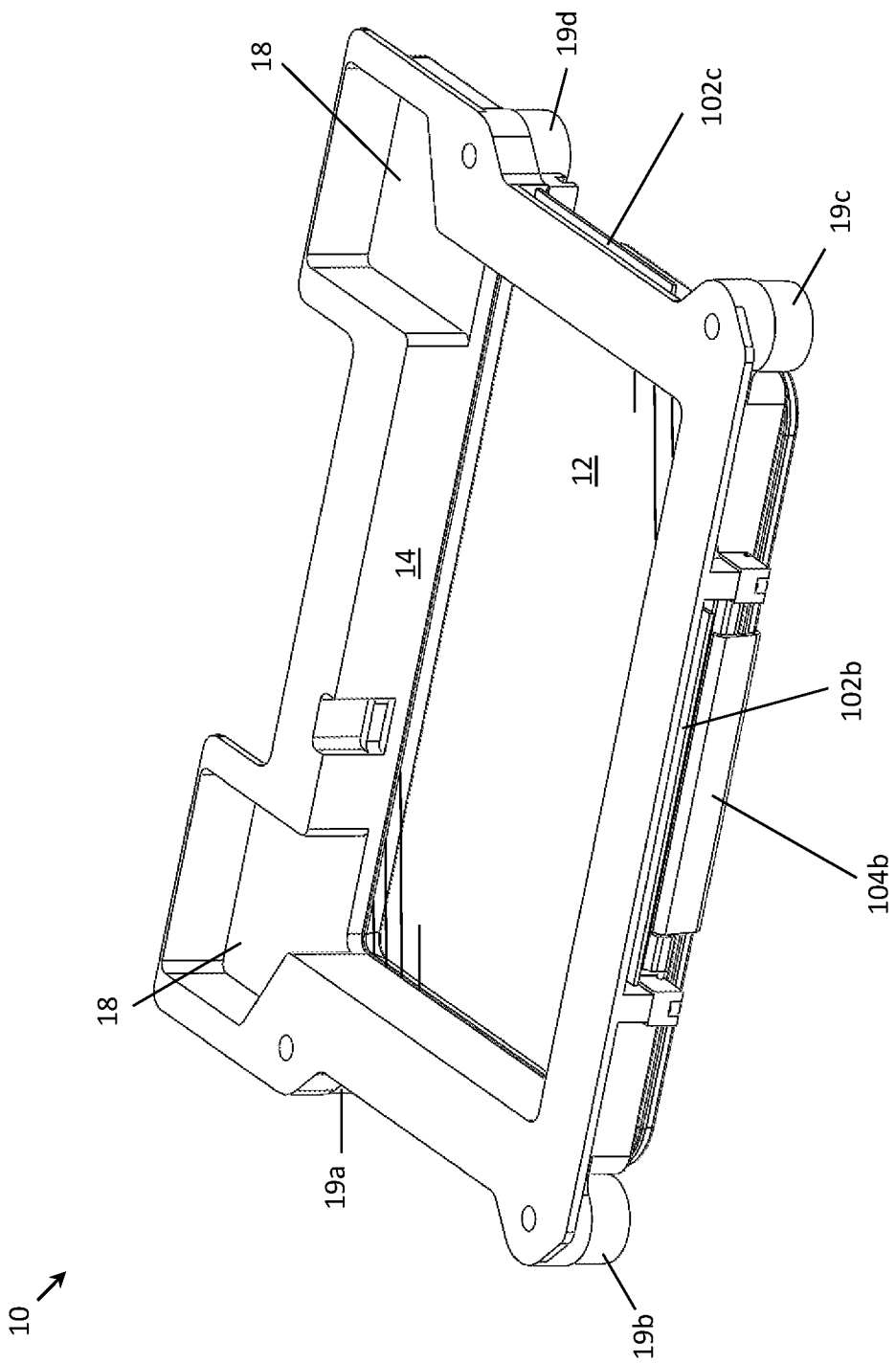
FIG. 10A depicts a top perspective view of the tank, in accordance with one embodiment of the invention.

FIG. 10A depicts a top perspective view of the tank 10. In contrast to the tank 10 depicted in FIG. 3, the resin receptacle 16 has been removed, exposing a second cove 18 of the tank 10. As will be more clearly shown and described in the following figures, a plurality of hinged clamps may be used to releasably secure the membrane assembly to a bottom groove of the tank sidewall 14. While four hinged clamps are illustrated in FIG. 10A, it is understood that a greater or fewer number of hinged clamps may be present in other embodiments. Each hinged clamp may include an arm and an angled member. The angled member may be manipulated by the hands of a user in order to activate or release the clamping (or locking) mechanism of the hinged clamp. A small portion of two of the angled members 102b, 102c and a portion of one of the arms 104b is visible in FIG. 10A. No resin is depicted in FIG. 10A for ease of illustration, but it is understood that when in use, resin would be present within the tank 10.

Figure 10B:
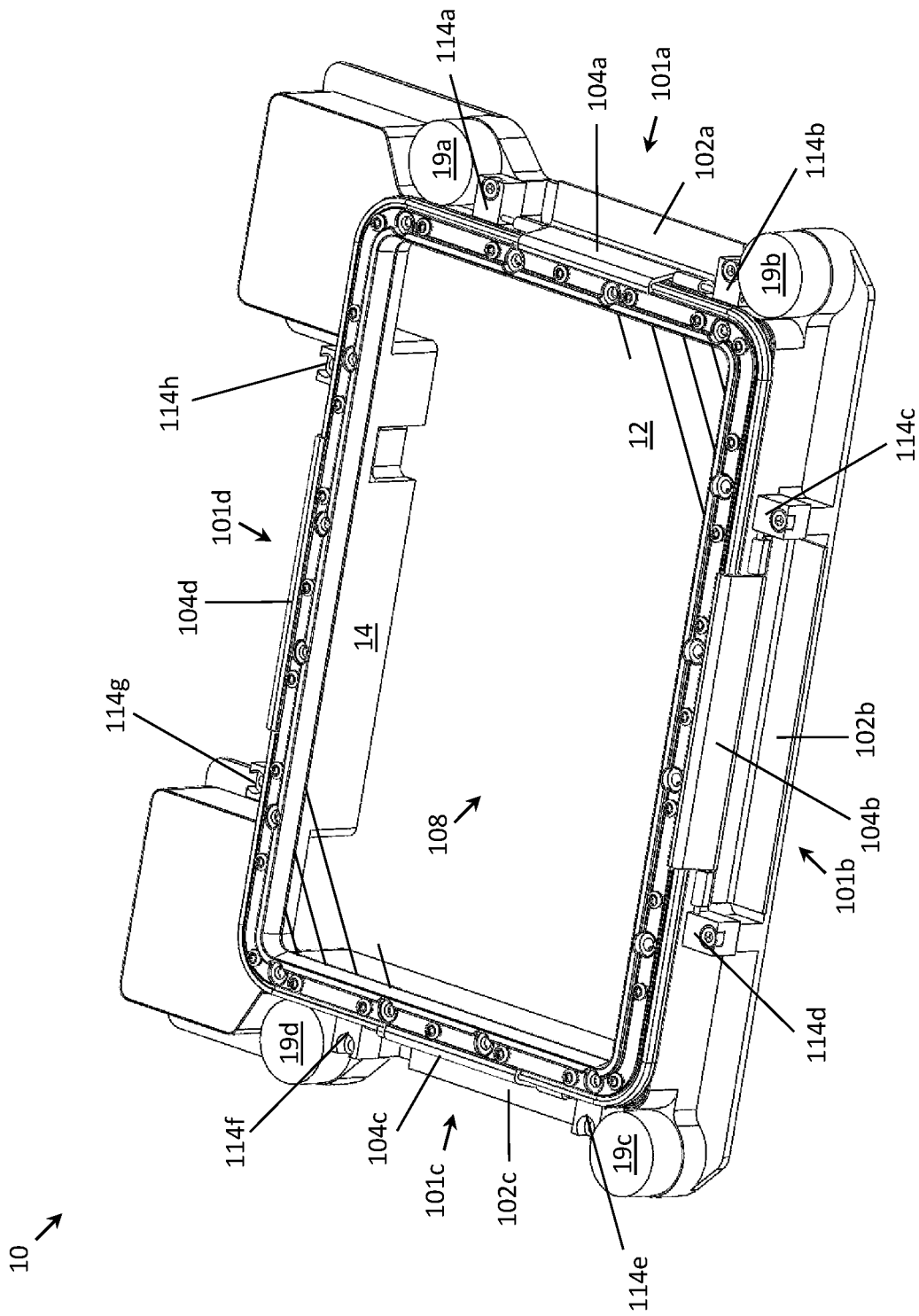
FIG. 10B depicts a bottom perspective view of the tank in which a membrane assembly is fastened to a groove of the tank sidewall by a plurality of hinged clamps, in accordance with one embodiment of the invention.

FIG. 10B depicts a bottom perspective view of the tank 10, in which a membrane assembly 108 may be fastened to a groove of the tank sidewall 14 by a plurality of hinged clamps 101a-d. Hinged clamp 101a may include angled member 102a and arm 104a; hinged clamp 101b may include angled member 102b and arm 104b; hinged clamp 101c may include angled member 102c and arm 104c; and hinged clamp 101d may include a fourth angled member (not visible) and arm 104d. The hinged clamps 101a-d are shown in the clamped (or locked) positions. In such clamped positions, the membrane assembly 108 is fastened to a groove of the tank sidewall 14 in a secure manner. No movement between the membrane assembly 108 and the tank sidewall 14 is possible, and the risk for resin to leak out from the bottom of the tank 10 is minimized. Each of the hinged clamps 101a-d may be secured to the outer surface of the tank sidewall 14 by a pair of anchor blocks. More specifically, hinged clamp 101a may be secured by anchor blocks 114a,b; hinged clamp 101b may be secured by anchor blocks 114c,d; hinged clamp 101c may be secured by anchor blocks 114e,f; and hinged clamp 101d may be secured by anchor blocks 114g,h.

Figure 10C:
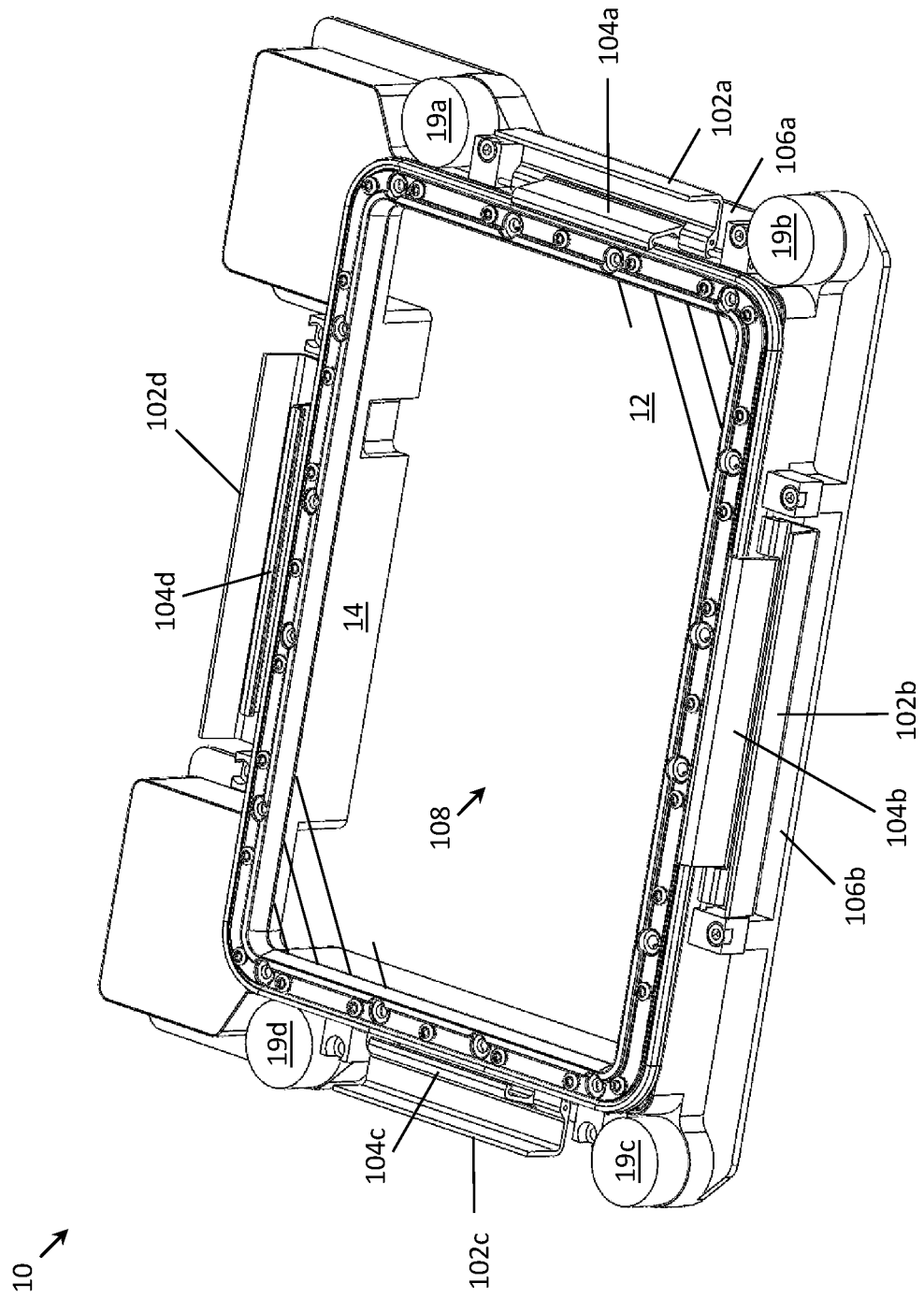
FIG. 10C depicts a bottom perspective view of the tank in which the membrane assembly is partially inserted within a groove of the tank sidewall, but is no longer fastened to the groove of the tank sidewall by the plurality of hinged clamps, in accordance with one embodiment of the invention.

FIG. 10C depicts a bottom perspective view of the tank in which the membrane assembly 108 is partially inserted within a groove of the tank sidewall 14, but is no longer fastened to the tank sidewall 14 by the plurality of hinged clamps 101a-d. To transition from the locked configuration of FIG. 10B to the unlocked configuration of FIG. 10C, each of the angled members 102a-d may be rotated in an upwards direction (upwards in the orientation of the tank 10 depicted in FIGS. 10B and 10C) about respective hinges. Stated differently, each of the angled members may be rotated away from the protruding surfaces of the tank sidewall 14. For example, angled members 102a-b may be rotated away from protruding surfaces 106a-b, respectively.

Figure 10D:
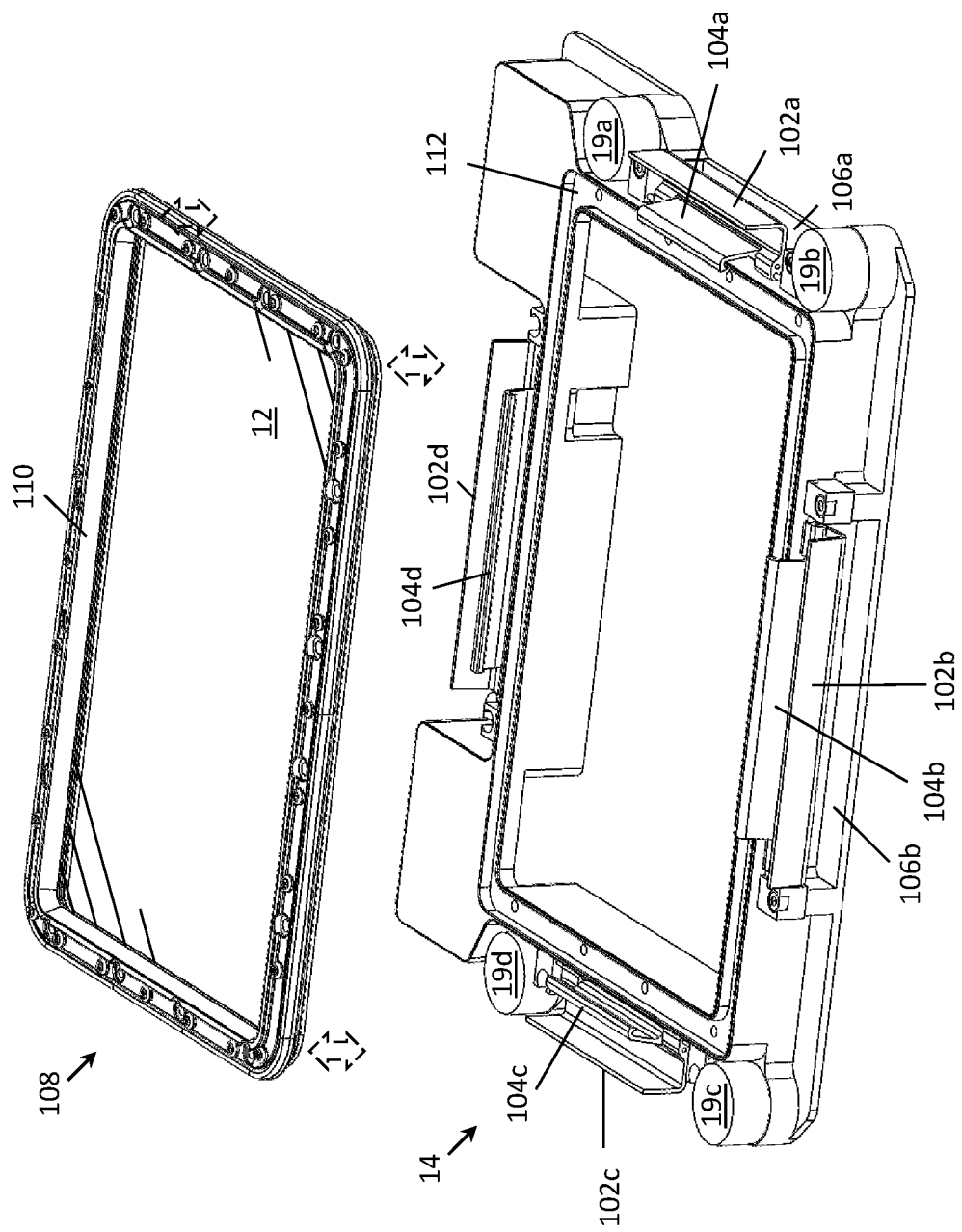
FIG. 10D depicts an exploded perspective view of the tank in which the membrane assembly is shown elevated above the tank sidewall, in accordance with one embodiment of the invention.

FIG. 10D depicts an exploded perspective view of the tank 10 in which the membrane assembly 108 is shown elevated over the tank sidewall 14. In such exploded perspective view, the groove 112 of the tank sidewall 14 is visible. When the tank 10 is oriented to contain resin (as in the top perspective view of FIG. 10A), such groove may be referred to as the bottom groove of the tank sidewall 14. The membrane 12 may be held in a stretched out manner by the rigid frame 110 of the membrane assembly 108.

Figure 10E:
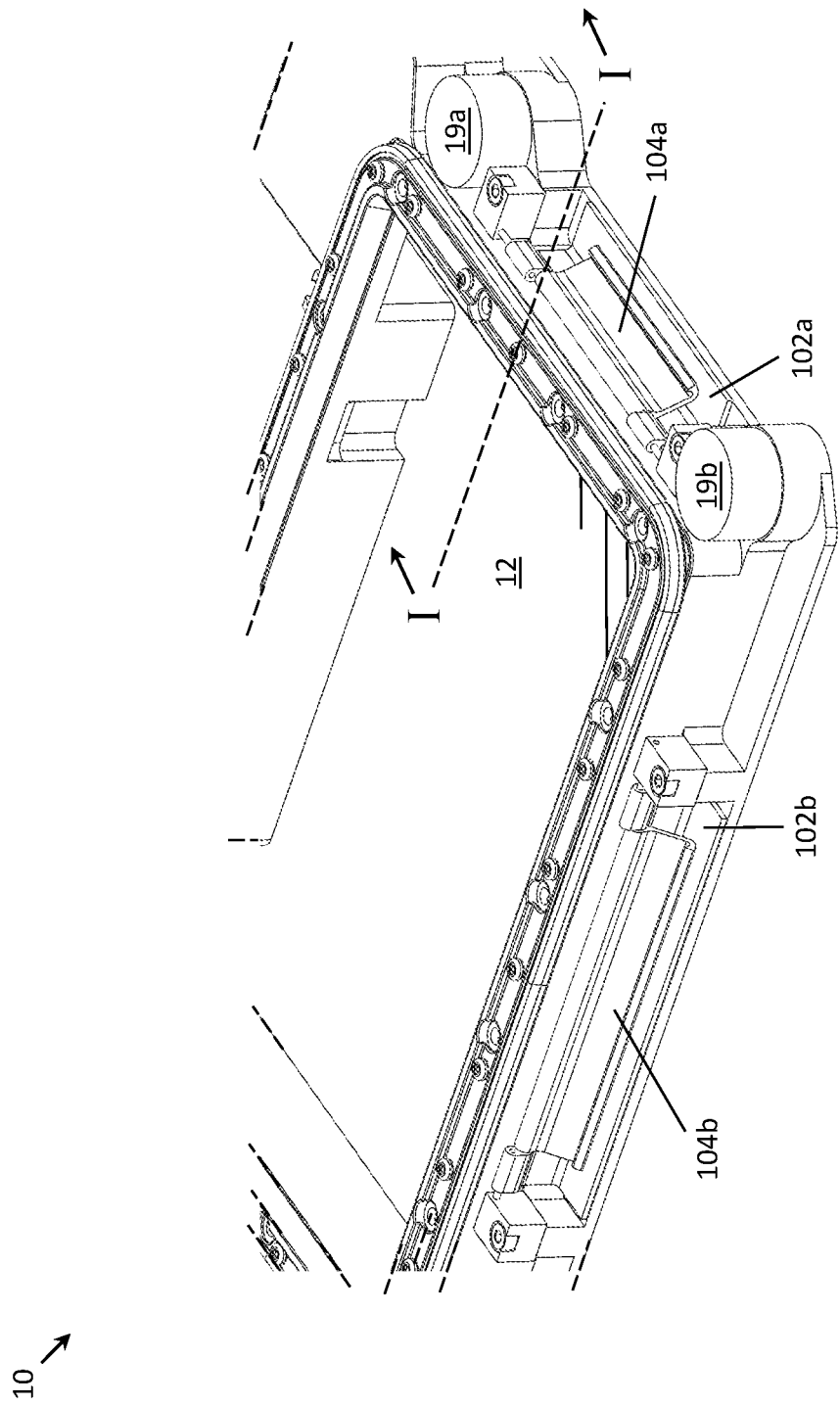
FIG. 10E depicts a magnified portion of the bottom perspective view of the tank, in accordance with one embodiment of the invention.
Figure 11A:
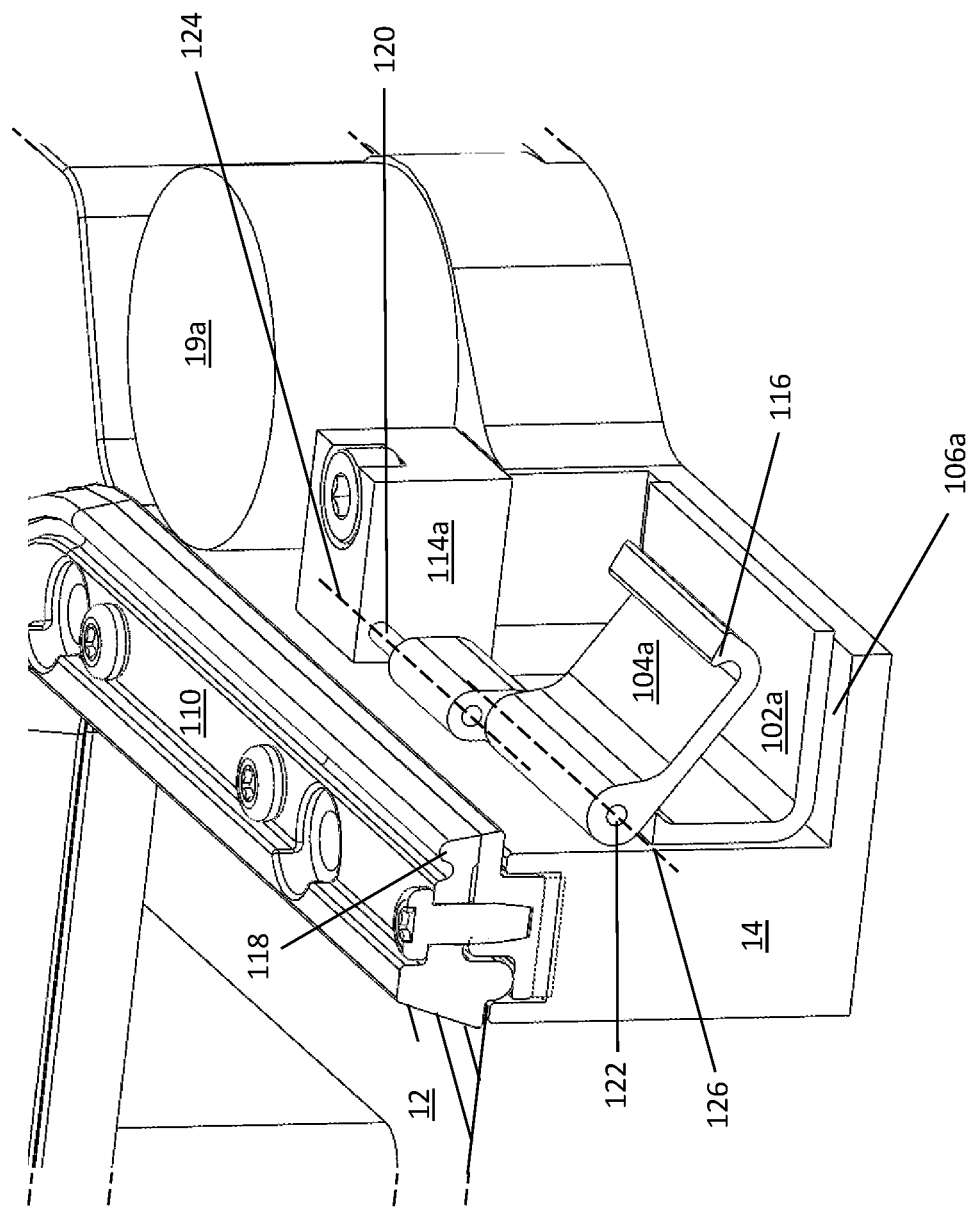
FIG. 11A depicts a magnified cross-sectional view along line I-I depicted in FIG. 10A, in accordance with one embodiment of the invention.

FIG. 10E depicts a magnified portion of the bottom perspective view of the tank 10. FIG. 11A depicts a magnified cross-sectional view along line I-I depicted in FIG. 10E. As more clearly shown in FIG. 11A, the angled member 102a of the hinged clamp 101a may be secured to the tank sidewall 14 by hinge 120, allowing the angled member 102a to rotate about axis 124. The hinge 120, which may include a rod inserted within a cylindrical shaft of the angled member 102a, may be secured to the tank sidewall 14 by a pair of anchor blocks, one of which 114a is visible in the cross-sectional view of FIG. 11A.

The arm 104a may be secured to the angled member 102a by hinge 122, allowing the arm 104a to rotate about axis 126, which may be oriented parallel to axis 124. Similar to hinge 120, hinge 122 may include a rod inserted within a cylindrical shaft of the arm 104a. A proximal end of the arm 104a may be attached to the hinge 122, while a distal end of the arm 104a may comprise a hooked attachment member 116 that is complementary to the shape of the lip 118 of the frame 110 of the membrane assembly 108.

Figure 11B:
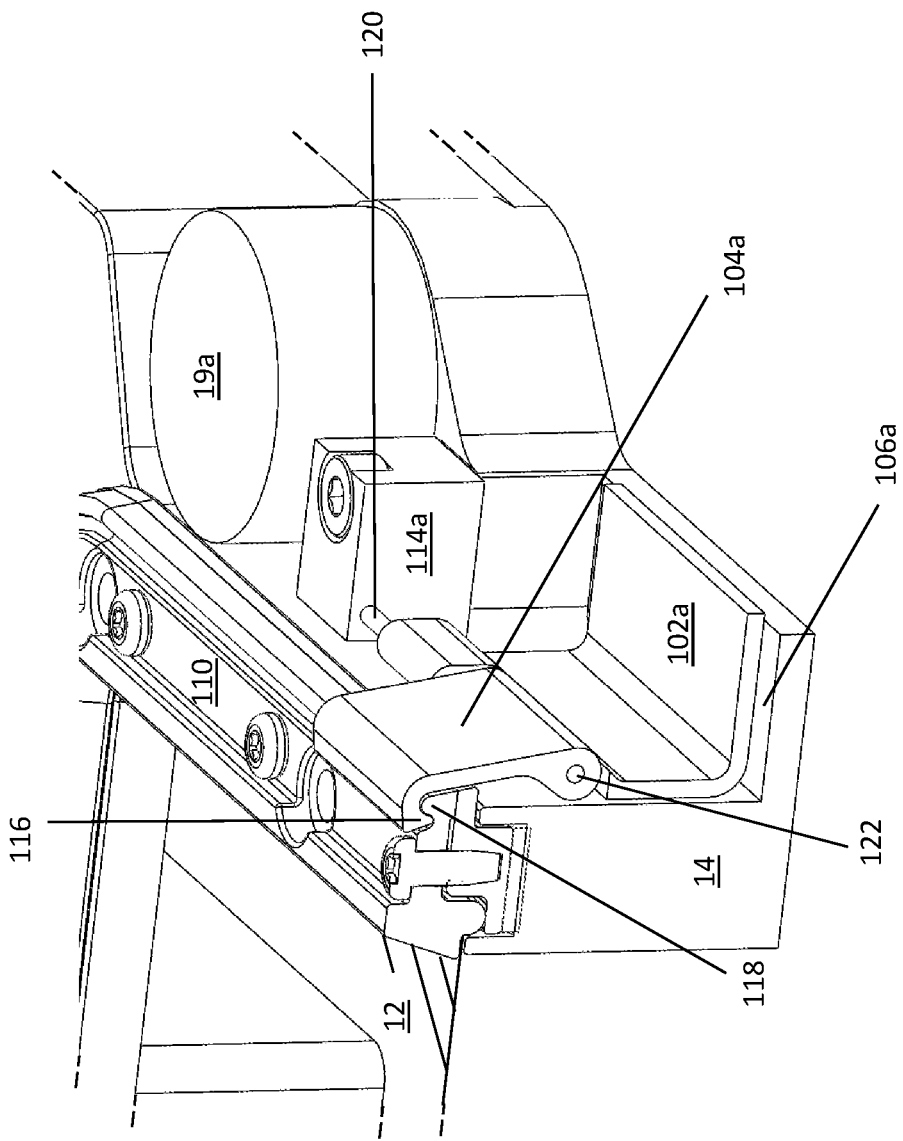
FIG. 11B depicts a similar cross-sectional view as FIG. 11A, except with the arm of the hinged clamp secured to the lip of the frame of the membrane assembly, in accordance with one embodiment of the invention.

To fasten the membrane assembly 108 to the tank sidewall 14, the following steps may be performed: First, the angled member 102a may be rotated away from the protruding surface 106a of the tank sidewall 14 until it reaches the unlocked position shown in FIG. 10C. It is noted that the angled member 102a may laterally extend further than the protruding surface 106a (as shown in FIG. 11A), allowing the backside of the angled member 102a to be contacted by the fingers of the user's hand in order to effect the above described rotation of the angled member 102a. Such rotation of the angled member 102a may cause the hinge 122 to pivot away from the tank sidewall 14. From such removed position of the hinge 122, the arm 104a may be rotated away from the protruding surface 106a until the hooked attachment member 116 is secured to the lip 118 of the frame 110. Finally, the angled member 102a may be pressed towards the protruding surface 106a, until the angled member 102a once again is oriented in its locked position, as shown in FIG. 11B. Importantly, such rotation of the angled member 102a causes the hinge 122 to pivot back towards the tank sidewall 14 (until the hinge 122 is disposed adjacent to the tank sidewall 14), which locks the hooked attachment member 116 securely to the lip 118 of the frame 110. In some embodiments, the locked position of the angled member 102a is reached when the angled member 102a is flush with the protruding surface 106a of the tank sidewall, but this is not necessarily so, and in other embodiments, there may be a small gap between the angled member 102a and the protruding surface 106a in the locked position of the angled member 102a.

Figure 11C:
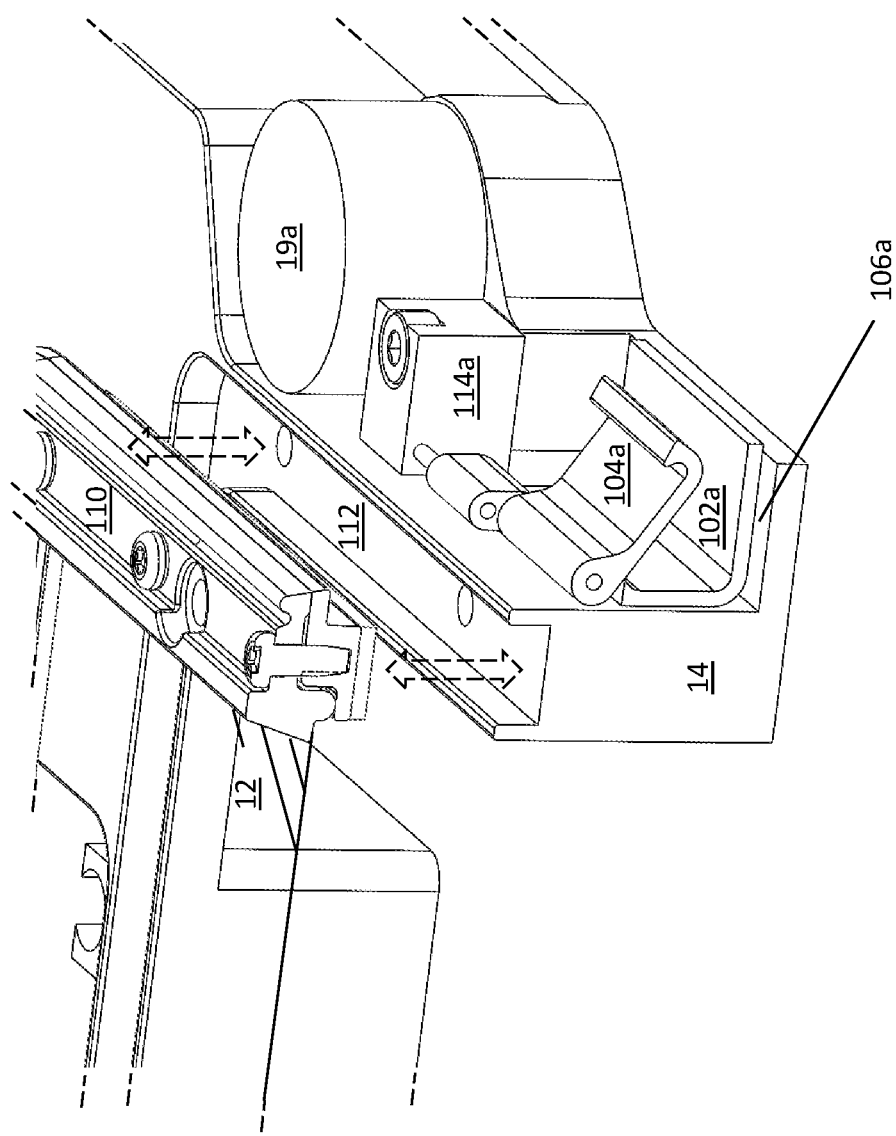
FIG. 11C depicts a similar cross-sectional view as FIG. 11A, except with the membrane assembly shown in an elevated position over the tank sidewall, in accordance with one embodiment of the invention.

To unfasten the membrane assembly 108 from the tank sidewall 14, the following steps may be performed: First, the angled member 102a may be rotated away from the protruding surface 106a of the tank sidewall 14 until it reaches the unlocked position shown in FIG. 10C. Such rotation of the angled member 102a may cause the hinge 122 to pivot away from the tank sidewall 14. From such removed position of the hinge 122, the arm 104a may be rotated towards the protruding surface 106a of the tank sidewall 14, which releases the hooked attachment member 116 from the lip 118 of the frame 110, as shown in FIG. 10C. At this point, the membrane assembly 108 may be removed from the tank sidewall 14, as shown in FIG. 10D. Alternatively, the angled member 102a may be rotated back towards the protruding surface 106a until it reaches the locked position shown in FIG. 11A, before the membrane assembly 108 is removed from the tank sidewall 14, as shown in FIG. 11C.

Figure 12:
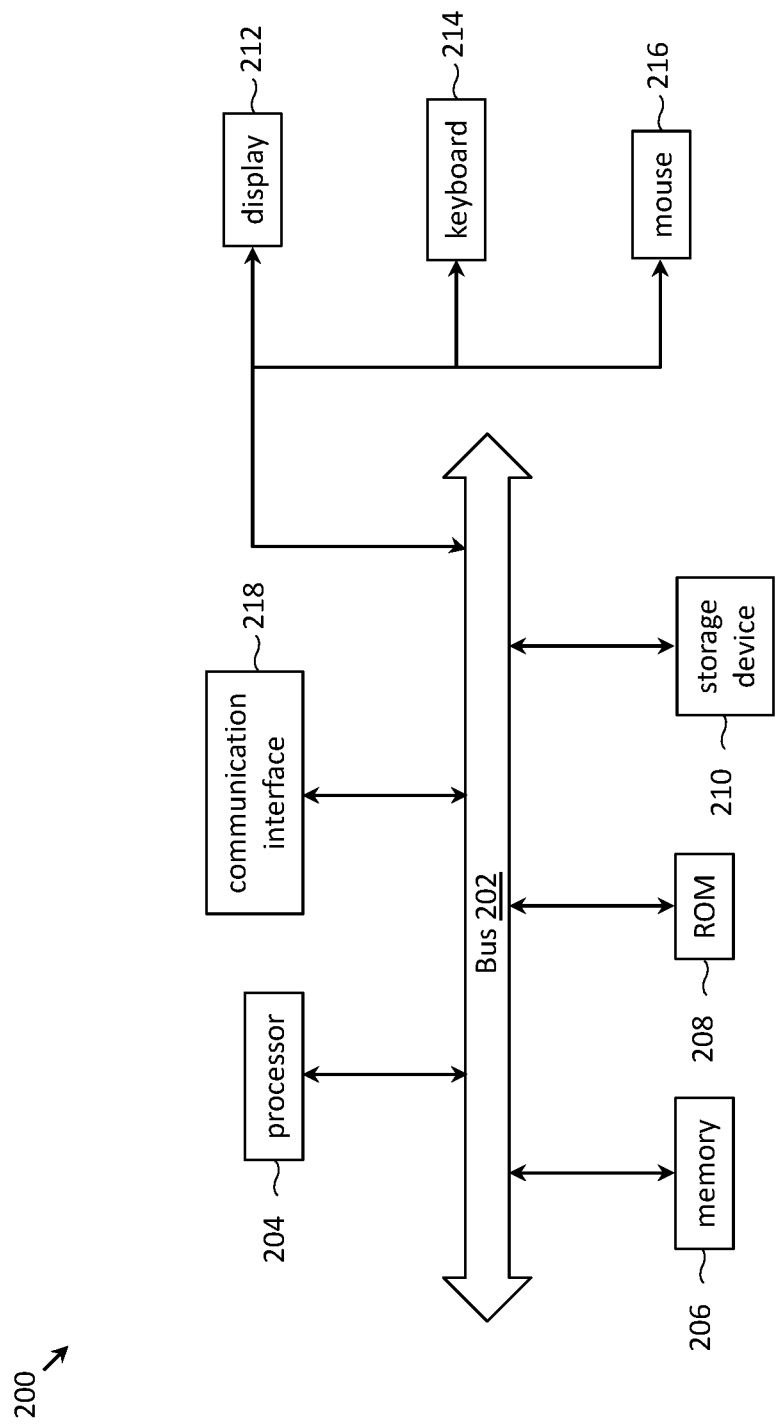
FIG. 12 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 12 provides an example of a system 200 that may be representative of any of the computing systems (e.g., controller 90) discussed herein. Examples of system 200 may include a smartphone, a desktop, a laptop, a mainframe computer, an embedded system, etc. Note, not all of the various computer systems have all of the features of system 200. For example, certain ones of the computer systems discussed above may not include a display inasmuch as the display function may be provided by a client computer communicatively coupled to the computer system or a display function may be unnecessary. Such details are not critical to the present invention.

System 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, for example a hard disk, flash memory-based storage medium, or other storage medium from which processor 204 can read, is provided and coupled to the bus 202 for storing information and instructions (e.g., operating systems, applications programs and the like).

Computer system 200 may be coupled via the bus 202 to a display 212, such as a flat panel display, for displaying information to a computer user. An input device 214, such as a keyboard including alphanumeric and other keys, may be coupled to the bus 202 for communicating information and command selections to the processor 204. Another type of user input device is cursor control device 216, such as a mouse, a trackpad, or similar input device for communicating direction information and command selections to processor 204 and for controlling cursor movement on the display 212. Other user interface devices, such as microphones, speakers, etc. are not shown in detail but may be involved with the receipt of user input and/or presentation of output.

The processes referred to herein may be implemented by processor 204 executing appropriate sequences of computer-readable instructions contained in main memory 206. Such instructions may be read into main memory 206 from another computer-readable medium, such as storage device 210, and execution of the sequences of instructions contained in the main memory 206 causes the processor 204 to perform the associated actions. In alternative embodiments, hard-wired circuitry or firmware-controlled processing units may be used in place of or in combination with processor 204 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 200 or similar electronic computing device, that manipulates and transforms data represented as physical (electronic) quantities within its registers and memories into other data similarly represented as physical quantities within its memories or registers or other such information storage, transmission or display devices.

Computer system 200 also includes a communication interface 218 coupled to the bus 202. Communication interface 218 may provide a two-way data communication channel with a computer network, which provides connectivity to and among the various computer systems discussed above. For example, communication interface 218 may be a local area network (LAN) card to provide a data communication connection to a compatible LAN, which itself is communicatively coupled to the Internet through one or more Internet service provider networks. The precise details of such communication paths are not critical to the present invention. What is important is that computer system 200 can send and receive messages and data through the communication interface 218 and in that way communicate with hosts accessible via the Internet. It is noted that the components of system 200 may be located in a single device or located in a plurality of physically and/or geographically distributed devices.

Thus, a 3D printing system has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

LIST OF REFERENCE NUMERALS

10 Tank (or vat)
12 Radiation-transparent flexible membrane
14 Tank sidewall
15 Holes
16 Resin receptacle
17 Air conduit
18 Cove
19a-d Magnets
20 Mask assembly
22 Mask
24 Frame
25a-d Screws
26a-d Ring members
27 Guide member
28 Electrical connector
29a-d Screw holes
30 Mask assembly receiving member
32a-d Magnetic posts
34 Slot
35a-d Screw holes
36 Electrical connector
38 Support bracket
40 Spill tray
42 Outerwall of spill tray
44 Bottom surface of spill tray
46 Central opening of spill tray
50 Light source housing
52 Light source fan
54 Light source
56 Electromagnetic radiation
60 Resin cartridge
62 Cartridge handle
64 Cartridge holder
70 Mount (height adjustment mechanism mount)
72 Extractor plate
74 Height adjustment mechanism
80 Printer housing
82 Opening (resin cartridge insertion hole)
84 Printer door
86 Resin level detector
90 Controller
92a-c Control signal paths
94 Resin
96 Build Area
98 Object
100 3D printing system
101a-d Hinged clamps
102a-d Angled members
104a-d Arms
106a-b Protruding surfaces
108 Membrane assembly
110 Frame
112 Groove
114a-h Anchor blocks
116 Hooked attachment member
118 Lip
120, 122 Hinges
124, 126 Axes
200 Computing system
202 Bus
204 Processor 206 Memory
208 ROM
210 Storage device
212 Display
214 Keyboard
216 Mouse
218 Communication interface

What is claimed is:

1. A three-dimensional (3D) printing system, comprising:
a tank including:
   a tank sidewall;
   a hinged clamp secured to the tank sidewall, wherein a first hinge of the hinged clamp is mounted adjacent to an outer surface of the tank sidewall; and
   a membrane assembly with a flexible radiation-transparent membrane included in a frame, the membrane assembly for forming a bottom of the tank when secured to the tank sidewall by the hinged clamp and having a lip about the frame for securably receiving a complementary portion of the hinged clamp; and
a light source configured to project radiation towards the bottom of the tank, wherein the frame comprises a first surface facing towards the tank sidewall and a second surface facing away from the tank sidewall, wherein the lip forms a portion of the second surface facing away from the tank sidewall, and wherein the complementary portion of the hinged clamp is secured onto the lip about the frame.

2. The 3D printing system of claim 1, wherein the complementary portion of the hinged clamp comprises a hooked attachment member.

3. The 3D printing system of claim 1, wherein the first hinge is secured to the tank sidewall by a pair of anchor blocks.

4. The 3D printing system of claim 1, wherein an angled member of the hinged clamp is secured to the tank sidewall by the first hinge.

5. The 3D printing system of claim 4, wherein the angled member is configured to rotate about a first axis.

6. The 3D printing system of claim 5, wherein the hinged clamp comprises an arm, and wherein a proximal end of the arm is secured to the angled member by a second hinge.

7. The 3D printing system of claim 6, wherein the arm of the hinged clamp is configured to rotate about a second axis, the second axis being parallel to the first axis.

8. The 3D printing system of claim 6, wherein a distal end of the arm of the hinged clamp comprises the complementary portion of the hinged clamp.

9. The 3D printing system of claim 6, wherein in a first position about the first axis, the angled member is configured to position the second hinge adjacent to the outer surface of the tank sidewall, and in a second position about the first axis, the angled member is configured to position the second hinge away from the outer surface of the tank sidewall.

10. The 3D printing system of claim 1, wherein the membrane assembly is secured within a bottom groove of the tank sidewall.

11. The 3D printing system of claim 1, further comprising a mask assembly disposed between the light source and the tank and including a mask with pixels configurable to be individually transparent or opaque to portions of the radiation projected from the light source.

* * * * *